United States Patent
Sibecas et al.

(10) Patent No.: US 7,310,379 B2
(45) Date of Patent: Dec. 18, 2007

(54) POLARIZATION STATE TECHNIQUES FOR WIRELESS COMMUNICATIONS

(75) Inventors: Salvador Sibecas, Lake Worth, FL (US); Celestino A. Corral, Lake Worth, FL (US); Shahriar Emami, Royal Palm Beach, FL (US); Glafkos Stratis, Lake Worth, FL (US); Gregg Rasor, Lantana, FL (US)

(73) Assignee: Motorola, Inc., Schaumburg, IL (US)

( * ) Notice: Subject to any disclaimer, the term of this patent is extended or adjusted under 35 U.S.C. 154(b) by 819 days.

(21) Appl. No.: 10/631,430

(22) Filed: Jul. 31, 2003

(65) Prior Publication Data

US 2004/0264592 A1 Dec. 30, 2004

Related U.S. Application Data

(63) Continuation-in-part of application No. 10/331,696, filed on Dec. 30, 2002.

(51) Int. Cl.
*H04B 7/02* (2006.01)

(52) U.S. Cl. .................... 375/267; 455/130
(58) Field of Classification Search ............ 375/260, 375/267, 299, 298, 347, 346
See application file for complete search history.

(56) References Cited

U.S. PATENT DOCUMENTS 5,764,696 A 6/1998 Barnes et al.
6,347,234 B1 2/2002 Scherzer
6,621,463 B1 9/2003 Lam
2002/0077071 A1* 6/2002 Williams et al. ............ 455/130

OTHER PUBLICATIONS

Stutzman, Warren L. "Polarization in Electromagnetic Systems", 1993 Artech House, Inc. ISBN 0-89006-508-X. pp. 18-43; 53-57; 61; 149-151.

Onggosanusi, etal., "Space-Time Polarization Signalling For Wireless Communications," Department of Electrical and Computer Engineering, University of Wisconsin-Madison, and National Science Foundation, IEEE 2000, pp. 188-192.

* cited by examiner

*Primary Examiner*—Chieh M. Fan
*Assistant Examiner*—Jaison Joseph

(57) ABSTRACT

Communication systems include a transmitter that modulates a radio signal transmitted from two differently polarized antennas during a state time in which a wave state of the radio signal conveys information and is based on one or more polarization states selected from a constellation of polarization states comprising at least three polarization states. The communication system includes a receiver that intercepts the radio signal by two differently polarized antennas during the state time, and demodulates the signal. The polarization states may identify user devices or may quantify a portion of the information intended for a user device.

40 Claims, 12 Drawing Sheets

700

800

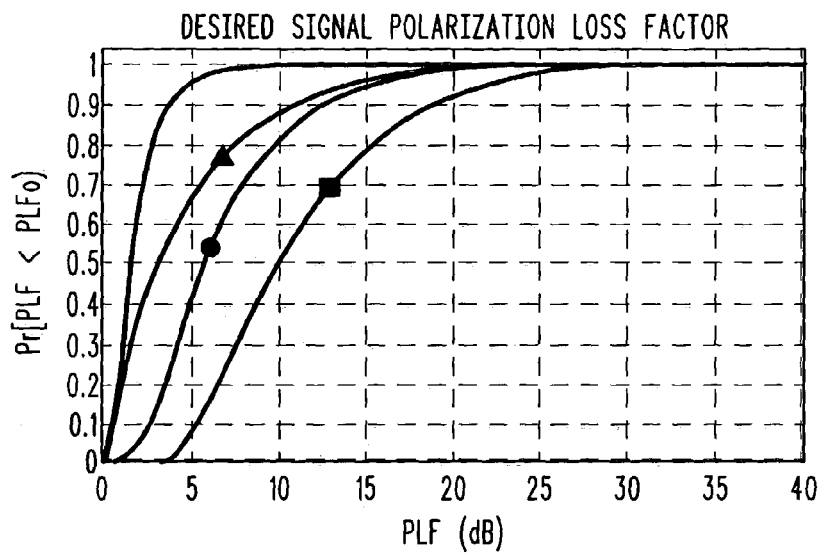

- ▲ NO RESTRICTION ON THE PS OF THE DESIRED AND THE INTERFERING SIGNALS
- ■ PS OF THE DESIRED AND INTERFERING SIGNALS RESTRICTED TO THE SAME REGION
- ● PS OF THE DESIRED AND INTERFERING SIGNALS RESTRICTED TO THE ADJACENT REGIONS
- — PS OF THE DESIRED AND INTERFERING SIGNALS RESTRICTED TO OPPOSITE REGIONS

*FIG. 10*

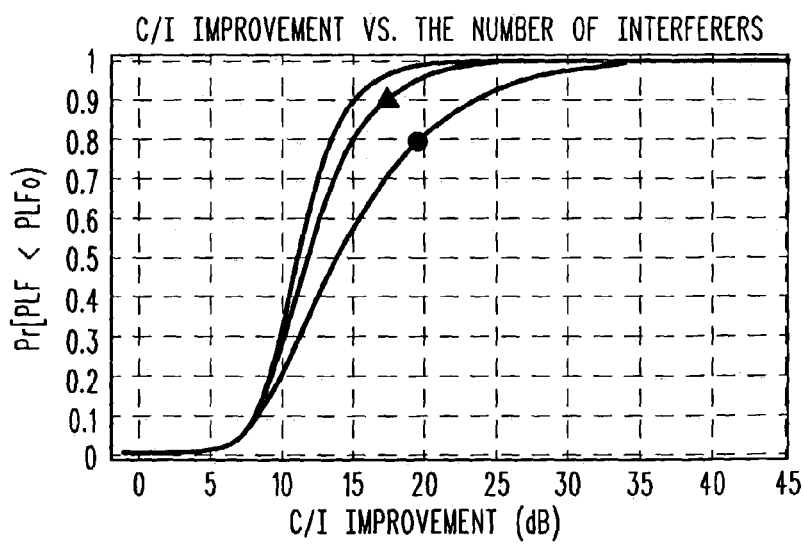

- ▲ THREE INTERFERING SIGNALS
- ● TWO INTERFERING SIGNALS
- — FOUR INTERFERING SIGNALS

NOTE: THE PS OF THE DESIRED AND THE INTERFERING SIGNALS WERE RESTRICTED TO OPPOSITE REGIONS

*FIG. 11*

POLARIZATION STATE TECHNIQUES FOR WIRELESS COMMUNICATIONS

This application is a Continuation-in-Part of a co-pending U.S. patent application Ser. No. 10/331,696, filed Dec. 30, 2002 entitled "An Enhanced OFDM by use of Alternating Polarization States", to Emami, et al.

FIELD OF THE INVENTION

This invention relates generally to the fields of multiplexing and modulation. More particularly, in certain embodiments, this invention relates to a scheme for use of polarization state techniques that are particularly useful in wireless communications.

BACKGROUND

The quest for increasing channel capacity and data rates within restrictions of limited resources (especially bandwidth limited by allocation and power limited by portable battery life) has led to the advancement of various technologies. One technology in which such advancement has been made is in techniques for modulation and channelization using domains based on phase, amplitude and frequency. One example of such advanced modulation techniques is orthogonal frequency division multiplex (OFDM), which has been successfully utilized in wireless local area network (WLAN) applications such as 802.11a and HiperLAN/2. In OFDM, the data are sent simultaneously over equally-spaced carrier frequencies using Fourier transform techniques for modulation and demodulation. By proper choice of frequencies in the Fourier transform conversion, OFDM can squeeze multiple modulated carriers into a prescribed band while substantially preserving orthogonality to eliminate inter-carrier interference. The resulting OFDM transmission can be made robust to multipath while still providing high data rates under varying channel conditions.

Another domain proposed for enhancing channel capacity is the use of multiple-input multiple-output (MIMO) antenna structures. In spatial multiplexing, the input data stream is split into a number of parallel streams and transmitted simultaneously. Despite its benefits, MIMO systems are not yet popular due to their inherent complexity and need for multiple antenna structures.

Finally, the polarization domain has been used in a particular manner in which two orthogonally polarized antennae are used to generate two corresponding orthogonal polarization states that are employed to improve data throughput. An example of this is in satellite communications, in which one antenna (and polarization state) is used to transmit a first set of data and an orthogonally polarized antenna is used to transmit a second set of data, thus doubling data throughput without increasing the bandwidth.

A need exists for technology that will further increase data throughput within systems that have limited resources.

BRIEF DESCRIPTION OF THE DRAWINGS

The present invention is illustrated by way of example and not limitation in the accompanying figures, in which like references indicate similar elements, and in which:

FIG. 10 is a graph having plots of simulations of a cumulative distribution function for a polarization loss factor;

FIG. 11 is a graph having plots of simulations of carrier-to-interference ratio improvement;

Figure 1:
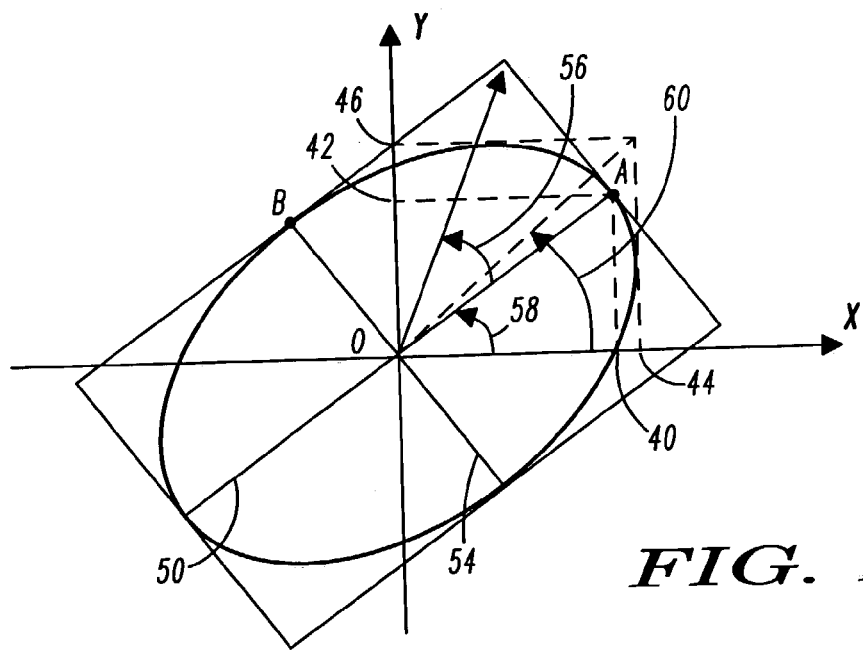
FIG. 1 is a drawing of a polarization ellipse showing field magnitudes and angles.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

While this invention is susceptible of embodiments in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

In certain embodiments, the present invention uses polarization states as a unique mechanism in wireless communications to improve channel capacity and/or to multiplex multiple users on the same channel. The use of polarization states can thus be used to provide an additional degree of freedom in wireless communications A signal waveform in space can be characterized by at least the following parameters: amplitude, time, frequency, phase, and polarization. Each of these parameters can be used in wireless communications for the purposes of implementing distinct signal characteristics for data transmission. While the first four have been amply studied and thoroughly developed for electronic communications, polarization has been mostly of interest in radar and optical applications. We shall consider here the application of polarization in a unique manner for wireless communication.

In its simplest terms, the polarization of a wave is a description of the motion of the tip of the instantaneous electric field vector with time at a fixed point in space. This means that we are actually taking a slice of the wave propagation in space and observing the oscillation of the field in that space. As an example, consider a linearly polarized wave; it has an electric field vector tip that moves in a straight line with time (see, for example, W. L. Stutzman, Polarization in Electromagnetic Systems, Boston, Mass.: Artech House, 1993).

The engineering application of polarization is appreciated from the perspective of antenna polarization. The surface current of the antenna creates a parallel electric field; the oscillating nature of the source current creates an oscillating field that leads to a spherical wave propagating away from the antenna structure. At long distances from the antenna, the electric field becomes entirely perpendicular to the direction of propagation, resulting in a planar wave. The plane containing the electric field vector (and magnetic field vector) of a plane wave is referred to as the plane of polarization.

Just as the surface current of a transmit antenna generates an electric field, so does the electric field induce a surface current on a receive antenna. If two antennas are co-polarized (i.e., they have the same polarization), then there is complete coupling of the electric fields from the transmitter to the receiver. If the antennas are cross-polarized (i.e., their polarizations are orthogonal), no current is induced in the receive antenna. This is true for any polarization, i.e., linear, circular, etc. Therefore, polarization may be considered as a signal level modifier that depends on the orientation of an antenna relative to the electric field of a transmitted or received propagating wave.

Consider the mathematical description of polarization. For a plane wave traveling in the −z direction, the instantaneous field can be written as $$E_z(z;t) = \hat{a}_x E_x \cos(\omega_c t + k \cdot z \phi_x) + \hat{a}_y E_y \cos(\omega_c t + k \cdot z + \phi_y) \quad (1)$$

where $k = 2\pi/\lambda$, and $E_x$ and $E_y$ are the maximum amplitude of the x and the y components, respectively. With amplitude modulation, it will be appreciated that $E_x$ and $E_y$ can vary with time, but are constant during a symbol period. Without any loss of generality for the purposes of this description, let $z=0$ such that (1) now becomes $$\vec{E}_z(0;t) = \vec{E}_z(t) = \hat{a}_x E_x \cos(\omega_c t + \phi_x) + \vec{a}_y E_y \cos(\omega_c t + \phi_y) \quad (2)$$

Of particular interest are the phases $\phi_x$ and $\phi_y$, as well as the ratio of the magnitudes, which can be used to generate the desired polarization. Some examples are given below:

$$\Delta\phi_{lp} = \phi_y - \phi_x = n\pi \quad n = 0,1,2, \quad (3)$$

$$\Delta\phi_{cp} = \quad (4)$$

$$\begin{cases} \phi_y - \phi_x = 2n\pi + \pi/2 & n = 0, 1, 2, \ldots \text{ for left-hand } (LHCP) \\ \phi_y - \phi_x = -(2n\pi + \pi/2) & n = 0, 1, 2, \ldots \text{ for right-hand } (RHCP) \end{cases}$$

$$|E_{xcp}| = |E_{ycp}| \quad (5)$$

where the subscripts lp and cp denote linear- and circular-polarized waves, respectively. These relationships are important to the subsequent development. We may simplify (2) further by letting $\phi_x = 0$ and $\delta$ be the phase by which the y component leads the x component of the electric field, thus $$\vec{E}_z(t) = \hat{a}_x E_x \cos(\omega_c t) + \hat{a}_y E_y \cos(\omega_c t + \delta) \quad (6)$$

Figure 2:
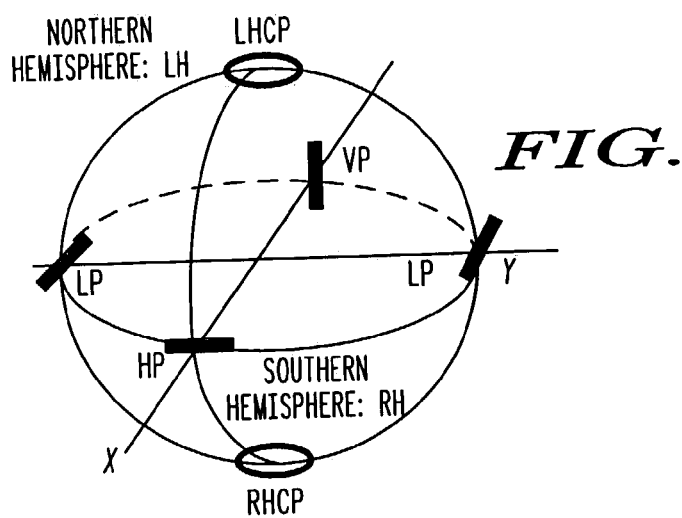
FIG. 2 is a drawing of a Poincaré sphere for mapping polarization states.

Through trigonometric relations it can be shown that the movement of the tip of the $E_z(t)$ vector at a fixed position (e.g., z=0) is elliptical in nature as shown in FIG. 1. A degree of polarization may be described by an axial ratio R, defined as $$R = \frac{E_{\max}}{E_{\min}} = \frac{OA}{OB} \geq 1 \quad (7)$$

which is the ratio of the major axis 50 to the minor axis 54 of the polarization ellipse. An ellipticity angle 56 is conventionally defined as $$\epsilon = \cot^{-1}(-R), -45° \leq \epsilon \leq 45° \quad (8)$$

with the convention that the sign of R=+ denotes right-hand and R=− denotes left-hand sense polarization. A tilt angle τ (58 in FIG. 1) is conventionally used to describe the orientation of the ellipse; it is the angle of the major axis 50 relative to the x axis, as shown in FIG. 2, and is given by $$\tau = \tan^{-1}\left(\frac{E_2}{E_1}\right), 0° \le \tau \le 180° \quad (9)$$

wherein $E_2$ is the x axis component 40 of the major axis and $E_1$ is the y axis component 42 of the major axis. The pair ($\epsilon$, $\tau$) is a pair of independent values that completely define the shape of the polarization ellipse. Another pair of independent values that completely define the shape of the polarization ellipse is ($\gamma$, $\delta$). The angle $\delta$ has been already described as the phase by which the y component leads the x component of the electric field, and for simplicity is called herein the polarization phase difference. The angle $\gamma$ (60 in FIG. 1) gives the relationship of the x and y axis amplitude components, and is defined below. There are other conventional methods of characterizing the polarization of an electric field, such as using Stokes parameters or a complex polarization ratio. These could be used as alternatives to the parameters used in the description below, since they can be related to the parameter pairs already described.

Linear polarization and circular polarization (signals with equal amplitude but with 90° of polarization phase difference) are special (limiting) cases of elliptical polarization. The importance of the polarization ellipse is made evident in the quantification of the "polarization state" of the signal, which refers to the values of the independent variables that characterize the polarization of the electric field during a state time, such as a symbol time or chip time, during which the variables remain constant. The amplitude relationships and angles described above uniquely determine the polarization state of the waveform. When several polarization states are mapped onto a Poincaré sphere, their relationships can be effectively visualized. A Poincaré sphere is shown in FIG. 2 with the "equator" of the sphere capturing all the linear polarizations and the "poles" capturing the circular polarizations. By convention, the "northern" hemisphere consists of all left-hand sense elliptical polarizations; the southern hemisphere is for right-hand sense elliptical polarizations. Points directly opposite each other on the surface of the sphere represent orthogonal polarization states. In this figure, LP=linear polarization, VP=vertical polarization, HP=horizontal polarization, LHCP=left hand circular polarization and RHCP=right hand circular polarization. The markings for the linear polarizations (LP) are meant to indicate an angle of 45 degrees with reference to the plane of the equator of the Poincaré sphere.

Borrowing from the well-known principle of orthogonality in function theory, it will be appreciated that any polarization state can be represented by a linear combination of orthogonal states. Therefore, to arrive at a given polarization state, the orthogonal states can be weighted appropriately such that their superposition results in the desired state. In conclusion, only two orthogonal states are needed to generate any polarization state.

Consider the generation of a linearly polarized wave at some desired tilt angle $\tau$. Using only left-hand circular polarization (LHCP) and right-hand circular polarization (RHCP) at equal amplitude but with phase relationships $\delta'$ (Note that the phase angles $\phi_x$ in equations (4) need not be equal), the resultant linearly polarized wave has tilt angle $\tau=\delta'/2$. Generation of elliptical polarization states requires the linear combinations of circular and linear polarization states, but since the latter are derived from circular polarizations, two orthogonal polarization states that can be used to generate an elliptical polarization state are two orthogonal circular states. Any polarization state may be generated from the linear combination of LHCP and RHCP waves.

However, LHCP and RHCP are infrequently employed in antenna structures. Dual-polarized antennas are typically constructed of linear horizontal and linear vertical polarized elements due to their inherent simplicity. Where two antennas are shown and described in this text, a dual-polarized antenna is functional equivalent. That is, for purposes of this discussion a pair of antennas in which one antenna is vertically polarized and one antenna is horizontally polarized may be equivalently referred to either as orthogonal antennas or as a dual-polarized antenna, without distinction. Dual-polarized antennas can also generate circular polarized waveforms based on the phase difference between the waves. Following the argument made above, then it is possible to generate any polarization state from linear horizontal and linear vertical polarizations. In fact any two orthogonal polarization states can be used to generate any other polarization state. This provides flexibility in the generation of polarization states even in existing antenna installations. When two antennas are used that are non-orthogonal, one of them is referred to herein as the reference antenna, while the other is referred to herein as the associated antenna.

In such situations, when the antennas are sufficiently close to orthogonality (for example, within a degree), the formulas given below will typically be adequate without modification In a situation in which two antennas are not sufficiently orthogonal, the values of the signals that must be transmitted or received by such non-orthogonally polarized antennas can be determined from the signal values determined for orthogonal antennas described herein, by using relationships derived from the polarization formulas described herein, and all polarization states may not be generated with sufficient magnitude. In such a case a third antenna may be necessary, or it may be more practical to re-align the antennas closer to orthogonality. Orthogonal antennas are thus preferred, but are not necessary. Orthogonal antennas will generally be used in the following descriptions of embodiments of the present invention.

We have worked thus far with the ellipticity and tilt angles as these are convenient for representation of the polarization on the ellipse and Poincaré sphere. Another angle pair relates directly to the signal parameters we discussed previously, namely: signal magnitudes (their ratio is used to determine the great circle angle $\gamma$) and $\delta$, the polarization phase difference. The values of $\gamma$ and $\delta$ are preferably used by the transmitter (and receiver) of the system to establish a desired polarization state, although, as mentioned above, other sets of independent parameters could alternatively be used. The great circle angle is defined as $$\gamma = \tan^{-1}\left(\frac{E_{2\max}}{E_{1\max}}\right), 0 \le \gamma \le 90° \quad (10)$$

wherein $E_{2max}$ is the maximum x-axis value 44 (FIG. 1) of the electric field and $E_{1max}$ is the maximum y axis value 46 of the electric field. The great circle angle $\gamma$ and the polarization phase difference δ, can be related to the ellipticity and tilt angles through $$2\epsilon = \sin^{-1}[\sin(2\gamma)\sin(\delta)] \quad (11)$$

$$2\tau = \tan^{-1}\left[\frac{\sin(2\gamma)\cos(\delta)}{\cos(2\gamma)}\right] \quad (12)$$

Figure 3:
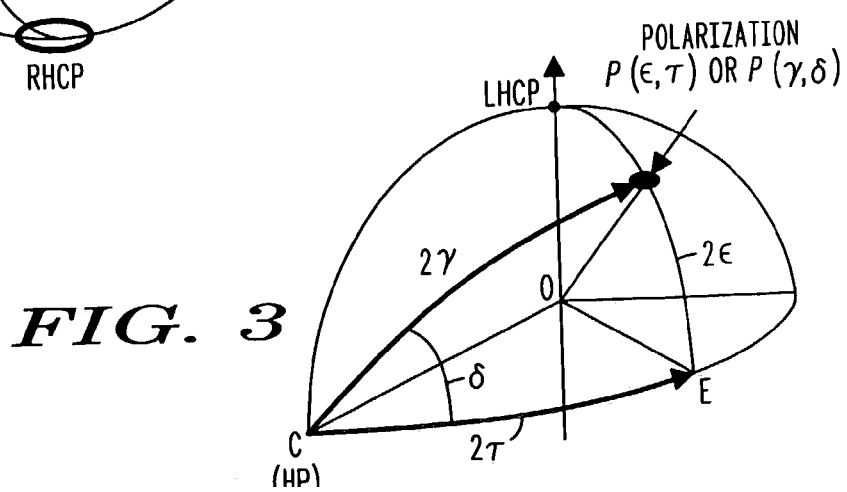
FIG. 3 is a drawing of a portion of a Poincaré sphere showing a mapping of a polarization state on the Poincaré sphere.

Referring to FIG. 3, a drawing of a portion of a Poincaré sphere shows a mapping of a polarization state P(γ, δ) on the surface of the Poincaré sphere. This polarization state can alternatively be characterized as polarization state P(ε, τ). The spherical angles ε, τ, γ, and δ are identified in FIG. 3, in which angle COE is an angle less than 90 degrees. The spherical angles 2ε and 2τ are, respectively, the latitude and longitude of P(ε, τ), while the spherical angles 2γ and δ are, respectively, the great circle distance from the horizontal polarization point to P(γ, δ) and the angle of the plane of that great circle with respect to the plane of the equator.

As stated above, the Poincaré sphere is effective for viewing polarization states in general, and also for measuring "distances" between polarization states. Furthermore, the impact of motion or environment changes on polarization can be succinctly captured by using the Poincaré sphere. In order to relate the uniqueness of the present invention to the representation of polarization states on a Poincaré sphere, first consider the transmission of one data stream on a horizontally polarized antenna and another data stream on a vertically polarized antenna, which is typical practice for conventional systems. The polarization of the electrical field of the planar wave that results from the transmission of these orthogonal polarization states can be represented by polarization states at the HP and VP points on the Poincaré sphere. (At this point the specifics of the modulation employed are not considered, and also not considered is whether a single-carrier or multi-carrier system is being modeled. Certain embodiments of the present invention can be implemented in any of these cases.) In theory, if the receiver employs horizontal and vertical polarized antennas and can resolve the signals, the data rate of the transmission may be doubled. This is accomplished using essentially no additional bandwidth. This increased throughput is not "free", since the range of each signal is determined by the power of the transmitted signal, but in a resource limited world, the ability to achieve more throughput can be extremely valuable. One can say that a set of two orthogonal polarization states is used to achieve this improvement. In accordance with the present invention, however, an apparatus and a method using a set of more than two polarization states is used to increase system throughput even further, and this is accomplished using only two orthogonally polarized antennas.

In general, this unique technique may be accomplished by first establishing a constellation, or a set, of polarization states that includes at least one non-orthogonal pair of polarization states. Because only diametrically opposing states on a Poincaré sphere are orthogonal to each other, this requirement is also met by establishing a constellation comprising at least three different polarization states using Poincaré sphere parameters. The constellation (P) of polarization states, or polarization constellation (P), is typically established at the time of system design (either as tables of values or equations that generate values), although in some applications, a polarization constellation may be selected from a plurality of polarization constellations $(P)_n$ established at system design time, or equivalently, a subset (P1) of a constellation (a sub-constellation (P1)) may be selected during system operation.

The polarization states of a constellation (P) are preferably designed to maximize a distance metric of the constellation. Preferably, the metric is based on distances determined using the Poincaré sphere, and in particular the great circle angle, or distance, between pairs of polarization states that identify neighboring tessellated regions is used. For example, the constellation can be designed to make the distance of such pairs approximately equal. As an example, 8 polarization states at the points of a cube inscribed in the Poincaré sphere will have equally spaced polarization states when the distances of neighbor states are measured using great circle distances. However, other metrics are possible. For example, a set of known polarization parameters are normalized Stokes parameters $s_1, s_2, s_3$, which can be treated as projections into a three dimensional (x, y, z) rectangular coordinate system of the Poincaré sphere state, so that another distance measurement could be a Cartesian distance between neighboring tessellated regions in this "Stoke's" space. Such distance metrics are also used to measure the distances between two polarization states when a state that is closest (at minimum distance) to given state is being sought.

During the transmission of information, one ($P_j$) or more ($P_{j1}, P_{j2}, \ldots$) polarization states that are to be used for modulating a transmitted signal during a state time are selected from the constellation of polarization states and optionally combined with orthogonal non-polarization modulation states to form a combined modulation state (wave state) that identifies a set of data associated with (i.e., intended for or transmitted by) a user device. Two components of each combined modulation state are used to modulate two signals; one signal is transmitted from a first antenna (the reference antenna) having a reference polarization (e.g., horizontally polarized) and the other signal is transmitted from a second antenna (the associated antenna) having a polarization different than the reference polarization (e.g., vertically polarized). The combined modulation states can include orthogonal non-polarization modulation states in addition to polarization states; examples of these are amplitude modulation states, absolute phase modulation states, frequency modulation states, or combinations of these modulation states. Examples of systems that operate in this manner are given below, but first a general description of an apparatus and method for transmitting a signal having a wave state that is determined based on one or more polarization states is described.

Figure 4:
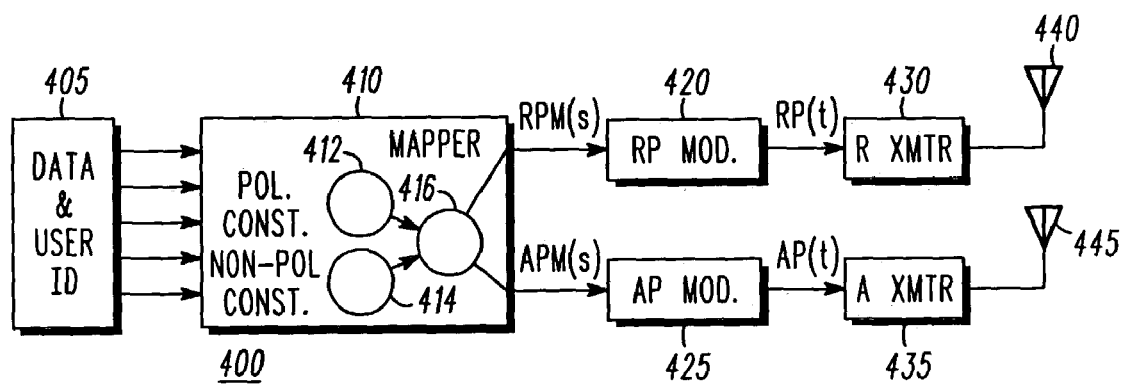
FIG. 4 is a block diagram of a transmitter apparatus, in accordance with a preferred embodiment of the present invention.

Referring to FIG. 4, a block diagram of a transmitter apparatus 400 used in a communication system is shown, in accordance with a preferred embodiment of the present invention. The transmitter apparatus 400 comprises a data and user device identification function 405 that prepares data associated with delivery of a portion of information to or from one or more user devices and couples the data to a mapper 410, which is also described herein as a polarimetric mapper, as a series of data sets, each of which is used to generate a wave state (WS(s)) during a state time (s). The data in one data set may be associated with more than one user devices. The data may represent any form of information, such as text, voice, image, video, or mixed media. The data and user device identification function 405 identifies the user device the data set is associated with, or, when the data set is associated with more than one user device, the data and user device identification function 405 identifies subsets of the data set and associated user devices intended to receive each subset. The mapper 410 uses the data sets and associated user device identifications to generate a series of reference polarization mapper output components (RP(s)) and a corresponding series of associated polarization mapper output components (AP(s)). The components RP(s) and AP(s) are alternatively called the reference wave state modulation signal and associated wave state modulation signal. These are the components of the wave state described above. Each combination of a pair of the reference and associated mapper output components defines a wave state (WS(s)) based a polarization state ($P_j$) selected by the mapper 410 from a constellation (P) of polarization states ($P_{j, j=1 \text{ to } J}$) comprising at least two non-orthogonal polarization states. The transmitter apparatus 400 further comprises a reference polarization (RP) modulator 420 that generates a modulated RP signal (RP(t)) that is a narrow band signal from the component (RP(s)) and an associated polarization (AP) modulator 425 that generates an modulated AP signal (AP(t)) that is a narrow band signal from the component (AP(s)). The modulated RP signal (RP(t)) is coupled to a reference signal (R) transmitter 430 which amplifies the modulated RP signal, generating a reference transmit signal that is coupled to a first polarized antenna 440. The modulated AP signal (AP(t)) is coupled to an associated signal (O) transmitter 435 which amplifies the modulated AP signal, generating an associated transmit signal that is coupled to a second polarized antenna 445 that is polarized differently than the first polarized antenna 440. Preferably, the polarizations of the two antennas 440, 445 are orthogonal. The radio signals from the two antennas 440, 445 combine in the far field to become a substantially narrow band plane wave radio frequency signal that is polarized in the combined modulation state as determined by the mapper 410.

For each state time, the mapper 410 selects at least one polarization state from a set, or constellation, of polarization states that are preferably stored in a polarization state table 412. There could be more than one polarization table, or the polarization states might be calculated as needed instead of being stored.

Also, for each state time, the mapper 410 may select orthogonal non-polarization modulation states, preferably stored in a non-polarization state table 414, although they might alternatively be calculated as well. Changes in the state of one orthogonal non-polarization modulation are independent from changes in the state of any other orthogonal non-polarization or polarization modulation, barring an externally imposed relationship. The orthogonal non-polarization modulations include amplitude, absolute phase, frequency, time (as in time hopping), or mutually exclusive combinations thereof (e.g., amplitude/absolute phase modulation is orthogonal to frequency and polarization modulation), and are hereafter referred to more simply as non-polarization modulations. States of non-polarization modulation are referred to herein as non-polarization states. An example of non-polarization modulation is the well known 16 QAM (quaternary amplitude modulation having 16 states). When one polarization state and one or more non-polarization states are selected, they are combined by the combining function 416 to generate the reference polarization mapper output component (RP(s)) and the corresponding associated polarization mapper output component (AP(s) for a state time. The combination of a polarization state and one or more non-polarization states to generate a combined modulation state is done by the combining function 416 in a manner that retains the orthogonal nature of the states. The following relationship illustrates this for amplitude/absolute phase. This relationship is obtained from equation (2) by scaling the amplitude coefficients so that their combined magnitude is 1, and by setting $\delta$ equal to the difference of $\phi_y$ and $\phi_x$.

$$\vec{E}_z(t) = |E|(\hat{a}_x e_x \cos(\omega_c t+\phi) + \hat{a}_y e_y \cos(\omega_c t+\phi+\delta)) \quad (13)$$

wherein $|E| = \sqrt{E_x^2 + E_y^2}$, $e_x = E_x/|E|$, and $e_y = E_y/|E|$

In equation 13, $\phi_x$ is now written as $\phi$ because it is common to both the x and y components of the electric field. For clarity, $\phi$ is referred to herein as the absolute phase of the electric field, to distinguish it from $\delta$, which is referred to herein as the polarization phase, or polarization phase difference. Equation (13) can also be written as $$\vec{E}_z(t) = |E|(\hat{a}_x \cos\gamma \cos(\omega_c t+\phi) + \hat{a}_y \sin\gamma \cos(\omega_c t+\phi+\delta)) \quad (14)$$

or in complex form as $$\vec{E}_z(t) = Re[|E|(\hat{a}_x \cos\gamma + \hat{a}_y e^{j\delta} \sin\gamma) e^{j(\omega_c t+\phi)}] \quad (15)$$

From equation 14, which is accurate for frequency signals that are narrow band signals, it can be seen that $|E|$, $\phi$, and $\omega_c$ can be varied from state time to state while the values of the polarization parameters, which are $\gamma$ and $\delta$, can be independently determined; thus, the amplitude state, absolute phase state, and frequency state can be changed independently from the polarization state.

Figure 5:
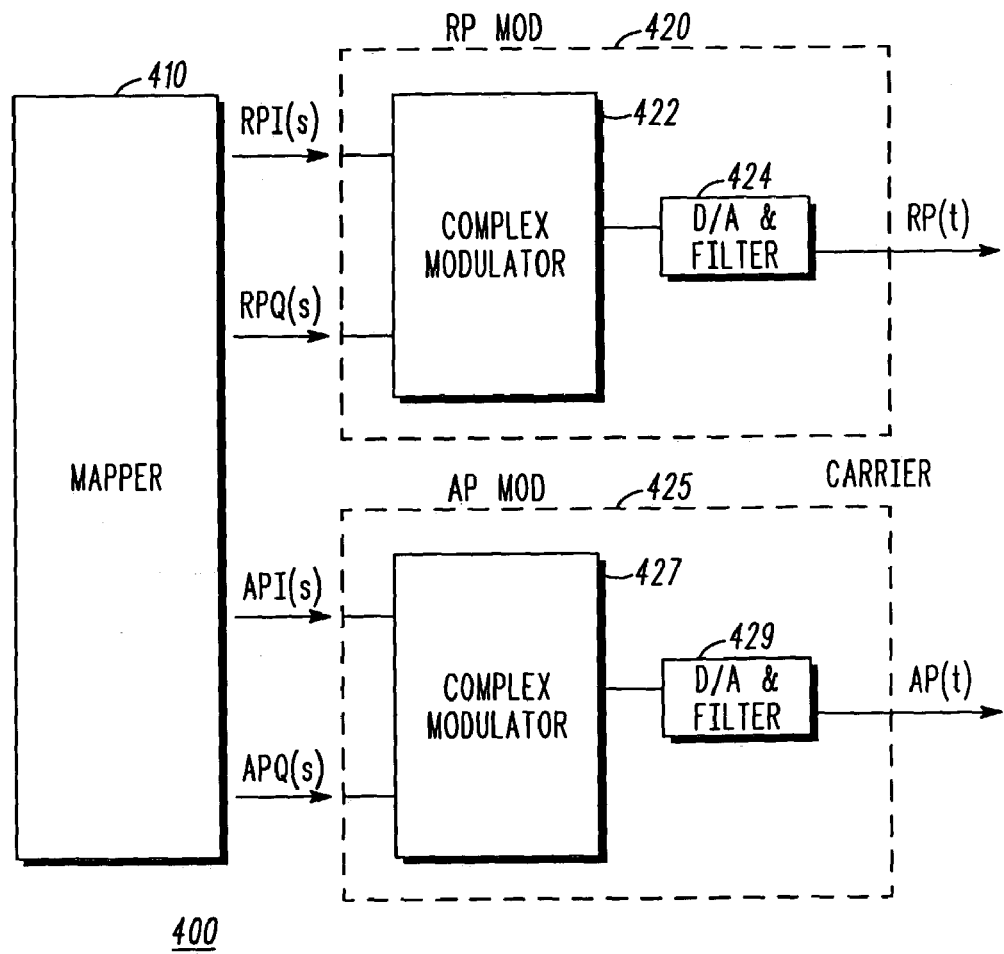
FIG. 5 is a block diagram of a portion of the transmitter apparatus shown in FIG. 4, in accordance with the preferred embodiment of the present invention.

Referring to FIG. 5, a portion of the block diagram of the transmitter apparatus 400 is shown, in accordance with the preferred embodiment of the present invention. In this embodiment of the transmitter apparatus 400, the outputs of the mapper 410 are actually generated as in-phase (RPI(s)) and quadrature (RPQ(s)) coefficients of the reference polarization mapper output component (RP(s), and in-phase (API(s)) and quadrature phase (APQ(s)) coefficients of the associated polarization mapper output component (RP(s)). For a polarization state, the in-phase and quadrature phase (wave state) coefficients of the mapper output components can be determined from equations (14) or (15) for orthogonally polarized antennas as:

$$RPI(s) = \cos\gamma_s = I_{RP} \quad (16)$$

$$RPQ(s) = 0$$

$$API(s) = \sin\gamma_s \cos\delta_s = I_{AP}$$

$$APQ(s) = \sin\gamma_s \sin\delta_s = Q_{AP}$$

wherein $I_{RP}$, $I_{AP}$, and $Q_{AP}$ are complex coefficients of the polarization state; $I_{RP}$ is the in-phase coefficient of the reference polarization component of the polarization state and $I_{AP}$, and $Q_{AP}$ are complex coefficients of the associated polarization component of the polarization state. When a polarization state ($\gamma_s$, $\delta_s$) is combined with an amplitude/absolute phase state ($|E_s|$, $\phi_s$), the in-phase and quadrature phase coefficients of the combined modulation (the wave state) can be determined from equation (14) or (15) for orthogonally polarized antennas as:

$$RPI(s) = |E_s| \cos\gamma_s \cos\phi_s = I_{RP}I_\Psi \quad (17)$$

$$RPQ(s) = |E_s| \cos\gamma_s \sin\phi_s = I_{RP}Q_\Psi$$

$$API(s) = |E_s| \sin\gamma_s \cos(\phi_s+\delta_s) = I_{AP}I_\Psi + Q_{AP}Q_\Psi$$

$$APQ(s) = |E_s| \sin\gamma_s \sin(\phi_s+\delta_s) = I_{AP}Q_\Psi - Q_{AP}I_\Psi$$

wherein $I_\Psi = |E| \cos\Psi$ and $Q_\Psi = |E| \sin\Psi$ are complex coefficients of the amplitude/absolute phase state. These coefficients are coupled to complex modulators 422, 427, which are preferably implemented using a digital signal processor to combine in-phase and quadrature phase coefficients to generate discrete time waveforms during a state time. The samples generated by the complex modulators are coupled to conventional digital-to-analog converter/filters 424, 429, which generate the RP(t) and AP(t) signals that are amplified and transmitted by the orthogonal antennas 440, 445. Alternative techniques, such as using analog complex modulators or other state machine complex modulators could be used. In accordance with a first embodiment of the present invention, the mapper 410 has a polarization table 412 that stores the parameter values $\gamma_j$, and $\delta_j$ for each state in the polarization constellation P, and has a non-polarization table 414 that stores the parameter values $|E_m|$, and $\phi_m$ for each state in a constellation $\Psi$ of amplitude/absolute phase states ($\Psi_{m,m=1\ to\ M}$). A polarization state can then be calculated using the equations (16) or a combined modulation state can be calculated using the center factors in the set of equations (17) to generate the complex I and Q wave state coefficients, RPI(s), RPQ(s), API(s), and APQ(s). In accordance with another embodiment of the present invention, the mapper 410 has a polarization table 412 that stores the complex coefficients $I_{RP}$, $I_{AP}$ and $I_{QP}$ for each state in the constellation of polarization states P, and has another table 414 that stores the coefficients $I_\Psi$ and $Q_\Psi$ for each state in a constellation of amplitude/absolute phase states $\Psi$, and these are combined using the right hand factors in the set of equations (17) to generate the I and Q wave state coefficients, RPI(s), RPQ(s), API(s), and APQ(s). In some embodiments, there may be a plurality of polarization tables and/or non-polarization tables, with selections of modulation states being restricted to one table for specific purposes. For example, polarization states that encode data symbols for a mobile unit might be selected by a base station from a polarization constellation or sub-constellation assigned to the user device.

Frequency modulation and frequency hopping can be accomplished by modifying the value of $\omega_c$. Time hopping can be accomplished by assigning time slots during which there is no signal and other time slots where the signal exists with a combined or single modulation state.

In one implementation of this embodiment a polarization state ($P_j$) is selected based on a pseudorandom number generated by a pseudo noise (PN) generator corresponding to a user device and an amplitude/absolute phase state ($\Psi_m$) is selected based on a subset of the set of data associated with (transmitted to or received from) the user device.

In another implementation of this embodiment an amplitude/absolute phase state ($\Psi_m$) is selected based on a pseudorandom number generated by a pseudo noise (PN) generator corresponding to a user device and a polarization state ($P_j$) is selected based on a subset of the set of data associated with the user device.

Figure 6:
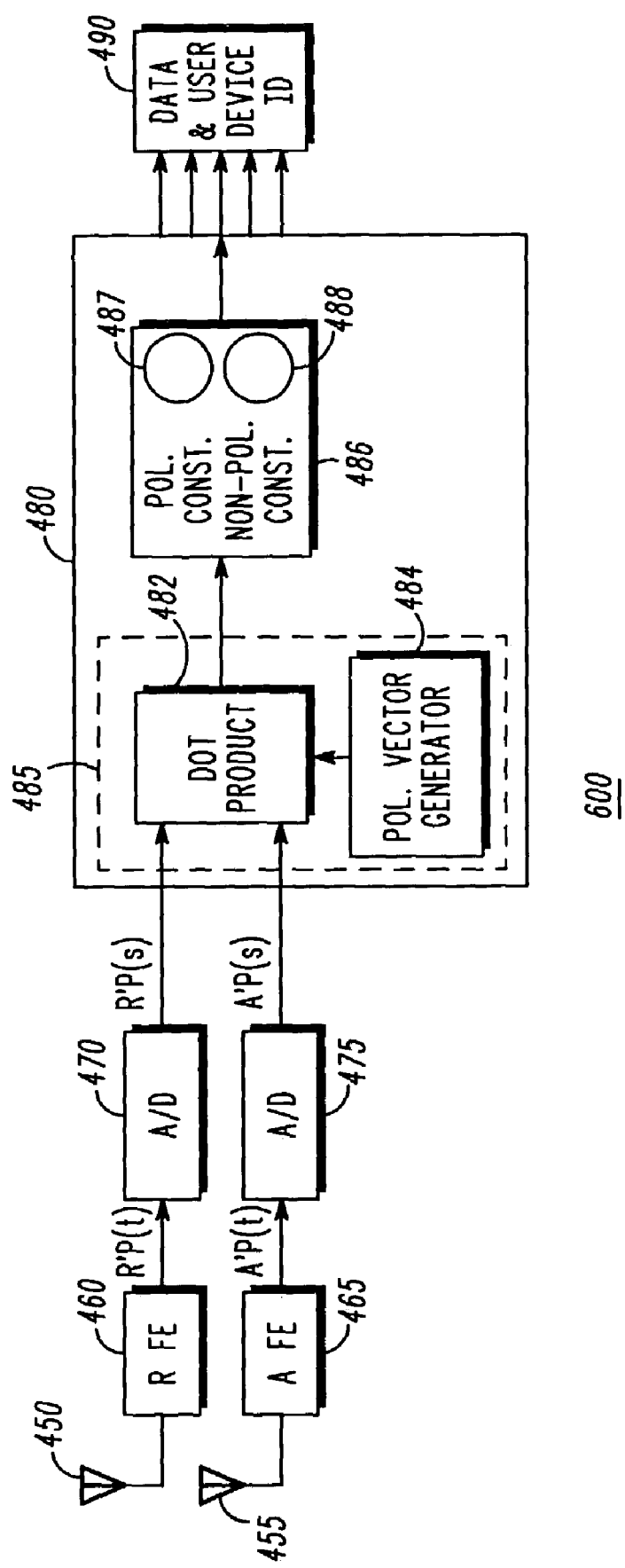
FIG. 6 is a block diagram of a portion of a receiver apparatus, in accordance with the preferred embodiment of the present invention.

Referring to FIG. 6, a block diagram of a receiver apparatus 600 used in a communication system is shown in accordance with the preferred embodiment of 400 described with reference to FIGS. 4 and 5.

Radio signals are intercepted by two differently polarized antennas 450, 455 that are may be orthogonally polarized and coupled to two receiver front ends, reference signal front end (R FE) 460 and associated signal front end (A FE) 465, which down convert the signals as necessary and convert them to baseband signals, reference received polarized signal component R'P(t) and associated received polarized signal component A'P(t). The baseband signals are then converted from analog to digital in A/D functions 470, 475. Synchronization with the frequency and phase of the transmitted signals is obtained, as well as determination of the relative amplitude of the received and transmitted signals and an angle of rotation between the received signal and transmitted signals, using techniques that may include receiving pilot signals. The A/D functions 470, 475 provide in-phase and quadrature phase sampled coefficients of reference received polarized sample component R'P(s) and associated received polarized sample component A'P(s). These coefficients are supplied to polarimetric processor (or polarimetric demapper) 480. The polarimetric processor 480 comprises a polarimetric filter 485 that corrects for channel imperfections (as described in more detail below), corrects for undesired signals (as described in more detail below), thereby generating a best estimate of a desired signal and a state demapper 486 that determines the most likely state that was transmitted. When the receiver 600 is designed to receive signals only intended for one user device, then the most likely state is coupled to the Data & User Device ID function 490, which need only accept the state as an indication of a set of data intended for the user device. When the receiver 600 is designed to receive signals intended for fixed equipment (i.e., base controller) processing, then the most likely state is coupled to the Data & User Device ID function 490, which can determine a user device ID and a set of data from the state. The state(s) may be transferred from the state demapper 486 to the Data & User Device ID function preferably, as a set of binary indices that are state numbers, or alternatively in other manners such as state parameters or digital in-phase and quadrature coefficients. For example, if there are 16 polarization states and 16 QAM states, the received polarization and amplitude/absolute phase states could be transferred as binary state numbers (e.g., 0110, 0101), or state parameters, (e.g., $\gamma$ and $\delta$ or $\epsilon$ and $\tau$ in radians converted to binary values for polarization, and +10, −11 for amplitude/absolute phase), or $I_{RP}$, $I_{AP}$, and $Q_{AP}$ for polarization and $I_\Psi$, $Q_\Psi$ for amplitude/absolute phase, as binary values). These same alternatives can be used for transferring this information from the Data & User ID function 405 to the polarimetric processor 410 of the transmitter 400.

The polarimetric filter 485 comprises a polarization vector generator 484 that is coupled to a dot product function 482. When a received signal includes simultaneous information that is associated with more than one user device and the user devices are identified by polarization states of the signal, the polarization vector generator 484 can determine the polarization states of user devices of undesirable signals, which it couples to the dot product function 482. The dot product function 482 performs a dot product of the in-phase and quadrature phase coefficients of the combined undesirable polarization vectors and the coefficients generated by the A/D functions 470, 475 to generate a best estimate of the desired signal. This is explained in more detail below. The desired signal is coupled to the state demapper 486, wherein the coefficients R'PI(s), R'PQ(s), A'PI(S), and A'PQ(s) are used to determine best estimates of the polarization and amplitude/absolute phase states. The state demapper 486 preferably comprises a polarization constellation (P') 487 and a non-polarization constellation (NP') 488 (in this example, an amplitude/absolute phase state constellation ($\Psi'$)), which contain at least the respective states associated with the receiver 600 (that is, they may be sub-sets of larger constellations included in a fixed network device). The polarimetric processor 480 uses the best estimates of the polarization and amplitude/absolute phase states and the constellations, which may be embodied as tables, to determine the states in the constellations that are closest to the best estimates, using a distance metric as described elsewhere herein. These are the most likely transmitted states ($P'_j$) conveyed to the Data and User Device ID function 490.

It will be appreciated that in a rudimentary version of this unique invention, no non-polarization states are used; at least three polarization states are used; one is used during each state time to identify a set of data. For example, 16 polarization states are used to identify sets of 4 bits. A communication system comprising the transmitter 400 and receiver 600, may be described as one in which a radio signal transmitted from two differently polarized antennas that is modulated during a state time in which a wave state of the radio signal conveys information and is based on one or more polarization states selected from a constellation of polarization states comprising at least three polarization states. A summary of one embodiment is that a non-polarization modulation state is formed from a portion of the information, a polarization state is selected that is associated with a user device, and the non-polarization modulation state is combined with the selected polarization state to form a user identifiable data symbol. Then user identifiable data symbols for different user devices are combined to determine the wave state. Linear combination may be used to combine the user identifiable symbols.

Now, other examples of unique uses of polarization modulation will be described.

Figure 7:
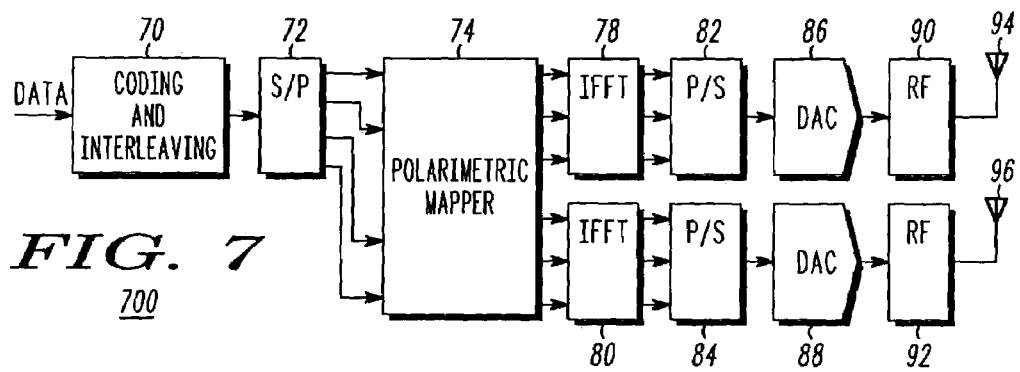
FIG. 7 is a block diagram of an example transmitter that employs polarization state mapping for data-rate increase in a multi-carrier orthogonal frequency division multiplexing (OFDM) system, in accordance with an embodiment of the present invention.

Referring to FIG. 7, a block diagram of an exemplary transmitter 700 that employs polarization state mapping for data-rate increase in a multi-carrier orthogonal frequency division multiplexing (OFDM) system is shown, in accordance with an embodiment of the present invention. Similar techniques could be applied to single carrier modulations and other multiple carrier modulations.

Input data are provided to a coding and interleaving block 70 that operates to provide redundancy that can correct signal path degradations such as fading. The output of block 70 is converted from serial to parallel data sets at 72. In this example 4-level quadrature amplitude modulation (QAM) is combined with 4 polarization state modulation, thereby doubling the data rate from two bits per state time to four bits per state time for each OFDM sub-channel. QAM symbols and polarization states are mapped to complex wave states at polarimetric mapping block 74, so that the complex number relates to the selected QAM and polarization state for the reference and associated polarization channels. An exemplary mapping of 4-level modulation QPSK states combined with a 4 polarization states that could be used by transmitter 700 is shown in TABLE 1. The polarization states are horizontal (H), vertical (V), 45° linear polarization (LP@45) and 135° linear polarization (LP@135).

In order to reduce the number of errors caused by detection of the wrong polarization state, Gray coding may be employed in an analogous manner to standard modulation techniques.

TABLE 1

| QPSK states (4) | Polarization States (4) | Wave States (16) |
|---|---|---|
| I, Q coefficients | Y, δ | RPI, RPQ, API, APQ coefficients |
| 1, 1 | 0, 0 (Horizontal Polarization) | +1 +1 0 0<br>−1 +1 0 0<br>+1 −1 0 0<br>−1 −1 0 0 |
| 1, −1 | 0, π/4 (45° Linear Polarization) | +√2/2 +√2/2 +√2/2 +√2/2<br>−√2/2 +√2/2 −√2/2 +√2/2 |

TABLE 1-continued

| QPSK states (4) | Polarization States (4) | Wave States (16) |
|---|---|---|
| −1, 1 | 0, π/2 (Vertical Polarization) | +√2/2 −√2/2 +√2/2 −√2/2<br>−√2/2 −√2/2 −√2/2 −√2/2<br>0 0 +1 +1<br>0 0 −1 +1<br>0 0 +1 −1<br>0 0 −1 −1 |
| −1, −1 | 0, −π/4 (135° Linear Polarization) | +√2/2 +√2/2 −√2/2 −√2/2<br>−√2/2 +√2/2 +√2/2 −√2/2<br>+√2/2 −√2/2 −√2/2 +√2/2<br>−√2/2 −√2/2 +√2/2 +√2/2 |

The complex states represented by the coefficients RPI, RPQ, API, and APQ for each sub-channel are then Inverse Fast Fourier Transformed (IFFT) at blocks 78 and 80 respectively, generating parallel sets of digitized amplitude values that are converted to serial values at blocks 82 and 84 respectively. It will be appreciated that performing the inverse fast Fourier transformation is functionally equivalent to performing frequency multiplexing using a plurality of frequency mixers, but is done in the digital domain, preferably using a digital signal processor.

To demonstrate this, when orthogonally polarized antennas are used, a single OFDM symbol is prepared for the reference and associated channels as $$S_{RP} = \frac{1}{\sqrt{N}} \sum_{m=0}^{N-1} (RPI_m + jRPQ_m)\exp(j2\pi mn/N) \quad (18)$$

$$S_{AP} = \frac{1}{\sqrt{N}} \sum_{m=0}^{N-1} (API_m + jAPQ_m)\exp(j2\pi mn/N) \quad (19)$$

where, m is the subcarrier frequency, N is the number of subcarriers within one OFDM symbol, and n represents discrete time. The real parts of (20) and (21), which are the signals that get transmitted, are $$S_{RP}(n) = \frac{1}{\sqrt{N}} \sum_{m=0}^{N-1} E_{Rm}\cos(2\pi mn/N + \theta_{Rm}) \quad (20)$$

$$S_{AP}(n) = \frac{1}{\sqrt{N}} \sum_{m=0}^{N-1} E_{Am}\cos(2\pi mn/N + \theta_{Am}) \quad (21)$$

with amplitudes $$E_{Rm}=\sqrt{RPI_m^2+RPQ_m^2},\ E_{Am}=\sqrt{API_m^2+APQ_m^2} \quad (22)$$

and phases $$\theta_{Rm}=\tan^{-1}(RPI_m/RPQ_m),\ \theta_{Om}=\tan^{-1}(OPI_m/OPQ_m) \quad (23)$$

The outputs of the IFFTs 78, 80 are converted to a serial set of values by the parallel-to-serial converters 82, 84. Digital-to-analog (D/A) conversion is performed at D/A converters 86 and 88 respectively, followed by amplification, frequency conversion, and filtering at RF sections 90 and 92, and transmission with two antennas 94 and 96. When the two antennas exhibit two orthogonal polarization characteristics, the transmitted signal on each path is given by $$S_{RP}(t) = \frac{1}{\sqrt{N}} \sum_{m=0}^{N-1} E_{Rm} \cos[2\pi(f_c + f_m)t + \theta_{Rm}], \quad (24)$$
$$0 \leq t \leq T_{OFDM}$$

$$S_{AP}(t) = \frac{1}{\sqrt{N}} \sum_{m=0}^{N-1} E_{Am} \cos[2\pi(f_c + f_m)t + \theta_{Am}], \quad (25)$$
$$0 \leq t \leq T_{OFDM}$$

Here, t is time, $f_c$ is the carrier frequency, and $f_m$ is the frequency of the $m^{th}$ subchannel. Note the similarity between Eqs. (24)-(25) and (2), with the phases and magnitudes corresponding, namely, $$E_{Rm} \cong E_x, \theta_{Rm} \cong \phi_x \quad (26)$$

$$E_{Am} \cong E_y, \theta_{Am} \cong \phi_y \quad (27)$$

Thus, it will be appreciated that polarization state mapping has resulted in a data-rate increase, in this case a doubling of the data rate.

The block diagram of the proposed polarization state mapping technique used in the transmitter described with reference to FIG. 7 shows duplicated operations for each of the reference and associated channels of the transmitter. The data sets are encoded and interleaved and sent to the serial-to-parallel converter 72. Each QAM data set is then mapped by polarization mapper 74 to a polarization state for each sub-channel, as determined from the set of data, and the mapper outputs are then processed by the IFFTs 78, 80. An option exists for extending the symbol cyclically (adding a guard interval), after which the data is processed by the parallel-to-serial converters 82, 84 amplitude coefficients. The amplitude coefficients are converted to an analog signal in DACs 86, 88 and then processed by the RF sections 90, 92 which perform up-conversion, amplification, and transmission.

Even higher data rate increases could be achieved by using more polarization states. For example, in an OFDM communication system, Q data symbols for N user devices may be sent using the following technique:

1) forming a non-polarization modulation state from a portion of the information;
2) selecting as the polarization state a polarization state that is associated with a user device;
3) combining the non-polarization modulation state with the selected polarization state to form a user identifiable data symbol;
4) repeating steps 1), 2), and 3) to form up to N user identifiable data symbols for each of a plurality of Q user devices;
5) combining a user identifiable data symbol for each of the Q user devices to form one of N sub-channel reference wave state components and one of N sub-channel associated wave state components;
6) combining N sub-channel reference wave state components formed at step 5), using Inverse Fast Fourier Transformation, to generate complex reference and associated wave state coefficients; and
7) generating the modulated radio signal using the complex reference wave state coefficients and complex associated wave state coefficients.

Figure 8:
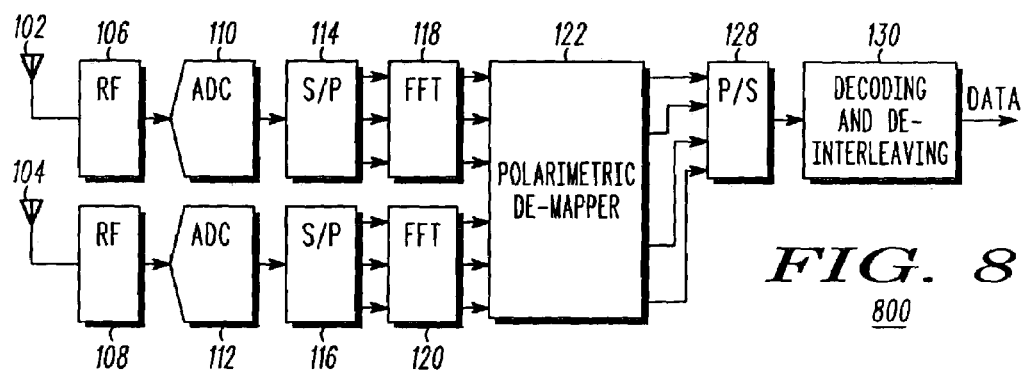
FIG. 8 is a block diagram of a receiver that receives signals from the transmitter described with reference to FIG. 7, in accordance with an embodiment of the present invention.

Referring to FIG. 8, a block diagram of a receiver 800 is shown in accordance with an embodiment of the present invention. Generally, the inverse of the operations performed in the transmitter 700 are done in the receiver 800 to recover the demodulated data. In this exemplary embodiment, two differently polarized antennas 102 and 104 provide the received signal to RF sections 106 and 108 respectively. RF sections 106 and 108 amplify, filter and convert the received signal to a baseband signal that is then converted to digital samples by analog to digital converters 110 and 112 respectively. The digital samples are then converted to parallel data values by serial to parallel converters 114 and 116 respectively. The parallel data values are Fast Fourier Transformed at FFT blocks 118 and 120 prior to processing by polarimetric processor (also called a demapper) 122 that corrects for channel imperfections and for undesirable signals (as described in more detail below), and maps the FFT data back to parallel data as it was produced by block 72 of the transmitter. The data is then converted to a serial data stream at 128 which is then passed to block 130 for decoding and de-interleaving to fully recover the originally transmitted data.

Thus, in certain embodiments consistent with the present invention, it is possible to assign a greater number of modulation states within a state time to implement a data rate increase, or to provide channelization, as described in more detail below. By following the technique described above, it is possible to implement a higher number of polarization state mappings (3 bits, 4 bits, etc.) for each OFDM signal. The only significant issue is the density of the polarization states on the Poincaré sphere, and the proximity of polarization states to each other for the purposes of uniquely identifying the states. We may view this as somewhat analogous to M-QAM, wherein higher signal-to-noise ratio (SNR) is needed; higher polarization power-to-noise ratio (PNR) is needed for a larger number of bits mapped to more polarization states.

An OFDM communication system comprising the transmitter 700 and receiver 800, can be described as one in which a plurality of frequency channels are generated, wherein each frequency channel has a polarization state during a state time that is based on a portion of information to be conveyed; and the plurality of frequency channels are combined by frequency multiplexing to form the wave state. When the digital approach described above is used, the frequency channels are digitally represented; real time signals are created only after the digital channels are combined.

It will be further appreciated that very similar techniques described herein with reference to OFDM transmitter 700 and receiver 800 can be used in an ultrawideband system for which each subcarrier has a bandwidth that meets the requirements of a regulatory body, and for which the aggregated bandwidth of the subcarriers is greater than 25% of a carrier frequency that is at a defined value (such as halfway) between the lowest and highest subcarrier frequency.

Polarization Mapping for Carrier to Interference Improvement

The polarization states may be mapped according to some prescribed quantity such that the states may fall in a specific region on the Poincaré sphere or spread throughout the entire sphere. In the latter instance, an appropriate choice of placing polarization states on a sphere is akin to the sphere tessellation problem, i.e., the distribution of points on the surface of a sphere. The propagation channel and required specifications will determine whether to distribute points uniformly on the Poincaré sphere. In static or even quasi-static channels, the equidistant distribution of polarization states may be suitable. However, in more mobile applications, it may be possible that certain regions of the sphere will tolerate more dense packing of polarization states than others. This can be tested via the transmission of polarization pilots and appropriate correction techniques at the receiver as shall be discussed below.

In the development of a communication system, one of the parameters deserving of careful consideration is the carrier-to-interference (C/I) ratio. For proper operation and reliable communication in a communication system, the value of this parameter generally has to exceed a certain level depending on the type of modulation employed. In cellular applications, the base stations (BS) transmitting on the same frequency are separated by some pre-defined distance as determined by C/I requirements, resulting in some reuse pattern. For these wireless systems in general, spectrum is allocated for operation in a certain region. Consequently, co-channel interference should be predicted and controlled.

This is not the case for wireless local area networks (WLAN) applications, where the available spectrum can be used by multiple systems as long as their equipment meets the rules defined by the Federal Communication Commission (FCC). No coordination is required among equipment manufacturers or service providers. Hence, the conventional methods of reuse to ensure C/I requirements may not apply. An embodiment of the present invention implements polarization state mapping to improve the co-channel interference and increase the capacity of the system.

To describe this embodiment, consider equations (24) and (25), which are fundamental polarization state mapping equations for OFDM. As we already noted, the polarization state of the transmitted signal (in the −z direction) is determined by the ratio of the amplitudes between the reference (e.g., horizontal) and the associated (e.g., vertical) components and by their phase difference. Under the appropriate conditions the output of the receiver reference (e.g., horizontally polarized) and associated (e.g., vertically polarized) antennas is given by $$S_R(t) = \frac{1}{\sqrt{N}} \sum_{m=0}^{N-1} R_{Rm} C_{Rm} \cos[2\pi(f_c + f_m)t + \theta_{Rm} + \phi_{Rm}], \quad (28)$$

$$0 \le t \le T_{OFDM}$$

$$S_A(t) = \frac{1}{\sqrt{N}} \sum_{m=0}^{N-1} R_{Am} C_{Am} \cos[2\pi(f_c + f_m)t + \theta_{Am} + \phi_{Am}], \quad (29)$$

$$0 \le t \le T_{OFDM}$$

where $C_m$ and $\phi_m$ represent the polarization channel tap gain and phase, respectively, for the $m^{th}$ subcarrier. Equations (28) and (29) assume that there is no ISI (intersymbol interference), no ICI (intercarrier interference) and that $T_{OFDM}$<< than the coherence time of the channel. In addition, this approach is also applicable, with obvious simplification, to narrowband single carrier systems.

In this embodiment, polarization state mapping can be exploited to increase system capacity by using a polarization state to identify information transmitted in one state time to a corresponding one of a plurality of mobile units (MU) (also known as user devices). Special attention is given to the polarization state mapping/de-mapping operations and polarimetric filtering is included as an additional polarization state manipulation that improves system performance.

Signal intensity is an unnecessary quantity in the polarization state description, so normalized complex vector representation is introduced as $$\hat{e} = \cos(\gamma_m)\hat{x} + e^{j\delta_m}\sin(\gamma_m)\hat{y} \quad (30)$$

with $$\gamma_m = \tan^{-1}\left(\frac{E_{Vm}}{E_{Hm}}\right), \quad 0 \le \gamma \le \pi/2; \quad (31)$$

$$\delta_m = \theta_{Vm} - \theta_{Hm}, \quad -\pi < \delta < \pi$$

When amplitude/absolute phase modulation is included, equation (30) expands to become equation (15).

As already noted, the parameter $2\gamma$ represents the angle of the plane of the great-circle distance from the horizontal polarization (HP) point and $\delta$ is the great-circle angle with respect to the equator. These angles are all that is needed to map the signal onto the Poincaré sphere.

Figure 9:
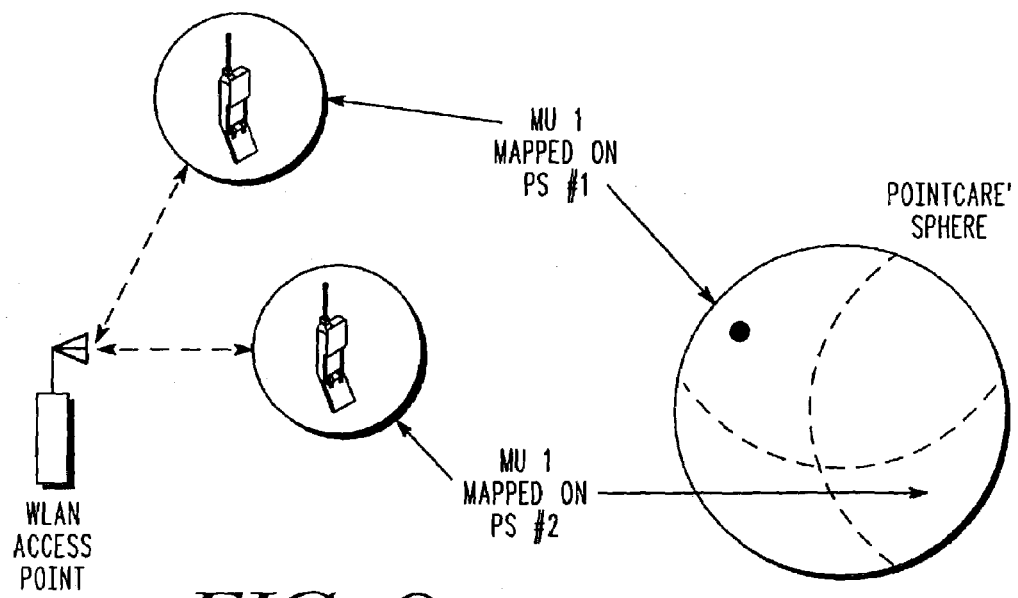
FIG. 9 illustrates a polarization state mapping onto a Poincaré sphere in a communication system that is consistent with certain embodiments of the present invention.

An example of the mapping and de-mapping operation is now described, referring to Table 2. In this example an access point (AP) communicates with multiple user devices using the same frequency and time slot, as depicted in FIG. 9. The transmitter 400 and receiver 600 described with reference to FIGS. 4-6 could be implemented to perform in accordance with this example. In this example, the reference and associated antennas are horizontally and vertically polarized antennas, respectively. We assume that the AP and each Mobile Unit (MU—also called a user device) are modeled as operating in a quasi-static environment such that the polarization state (PS) of the received signal does not change for the duration of a frame comprising a plurality of symbol times. In order to simplify the calculations, the analysis will be in reference to a single subcarrier, with an appreciation that similar operations can be performed with the other subcarriers. We shall consider first, then, the mapping of an amplitude/absolute phase constellation for each of two MU's onto a PS assigned to each MU as tabulated in TABLE 2, resulting in the generation of user identifiable data symbols.

TABLE 2

| MU, Amp/Phase Type | Amp/Phase State $\|E_m\|, \Phi_m$ | Polarization State $Y_m, \delta_m$ | Horizontal Channel Complex Voltage | Vertical Channel Complex Voltage |
|---|---|---|---|---|
| 1, 00 | 1.082, 32.5° | 22.49°, 0° | $e^{j32.5}$ | $0.414e^{j32.5}$ |
| 2, 00 | 1.181, −32.5° | 64.95°, 0° | $0.5e^{-j32.5}$ | $1.07e^{-j32.5}$ |
| 1, 10 | 1.082, 52.5° | 22.49°, 0° | $e^{j52.5}$ | $0.414e^{j52.5}$ |
| 2, 10 | 1.181, −12.5° | 64.95°, 0° | $0.5e^{-j12.5}$ | $1.07e^{-j12.5}$ |
| 1, 11 | 1.082, 72.5° | 22.49°, 0° | $e^{j72.5}$ | $0.414e^{j72.5}$ |
| 2, 11 | 1.181, 7.5° | 64.95°, 0° | $0.5e^{j7.5}$ | $1.07e^{j7.5}$ |
| 1, 01 | 1.082, 92.5° | 22.49°, 0° | $e^{j92.5}$ | $0.414e^{j92.5}$ |
| 2, 01 | 1.181, 27.5° | 64.95°, 0° | $0.5e^{j27.5}$ | $1.07e^{j27.5}$ |

In TABLE 2, horizontal and vertical components are along the same row. The combined modulation state values are selected so that each combination maps to a single polarization state on the Poincaré sphere for each user device. Now assume that the PS of the transmitted state intended for a first MU lies in a first region of the Poincaré sphere and that the PS of the transmitted state intended for another MU lies in a non-adjacent region, as shown in FIG. 9. These states could be analyzed in the manner as shown in TABLE 2 for each of the units. The transmitter 400 and receiver 600 described with reference to FIGS. 4-6 could also be implemented to perform in accordance with this example.

For simplicity, now assume that both MUs use the same quadrature phase shift keying (QPSK) states (but they need not necessarily be defined in the same order). Complex coefficients are added and used to generate transmit signal components applied to the reference and associated antennas to generate one polarization state for each selected user. Thus, the wave state is determined by a linear combination of the user identifiable data symbols for different user devices. The composite electric field at the transmitter antenna output of the AP can now be written as $$\vec{E}(nT) = \left\{ \sum_{n=1}^{N} E_{H1}(nT)\cos[2\pi(f_c + f_1)(t - nT) + \theta_{H1}(nT)] + \right. \quad (32)$$

$$\left. \sum_{n=1}^{N} E_{H2}(nT)\cos[2\pi(f_c + f_1)(t - nT) + \theta_{H2}(nT)] \right\} \hat{x} +$$

$$\left\{ \sum_{n=1}^{N} E_{V1}(nT)\cos[2\pi(f_c + f_1)(t - nT) + \right.$$

$$\left. \theta_{V1}(nT)\cos[2\pi(f_c + f_1)(t - nT) + \theta_{V2}(nT)] \right\} \hat{y}$$

where E(nT) is the amplitude of an electric field during the nth symbol period T, θ(nT) is the nth phase during period T, H1 represents a "horizontal" (reference) state of user 1, V2 is a "vertical" (orthogonal) state of user 2, etc., $f_c$ is the carrier frequency, and $f_1$ is the frequency of the first subcarrier (which is selected for our description). Since the IFFT is a linear operator, it allows the generation of multiple symbols with different polarization states simultaneously. Indeed, although only one interferer is considered, it may be possible to support more users if the degradation in C/I can be tolerated (This is described in more detail below).

At the receiver of the first MU, after the quantization (A/D) process, the generated complex voltages are sent to the FFT block where the demodulation takes place. The output of the FFT can now be written as $$S_H(t)=R_{H1}C_{H1} \exp [j(\theta_{H1}+\phi_{H1})]+R_{H2}C_{H2} \exp [j(\theta_{H2}+\phi_{H2})]=K_{H1}+K_{H2}, \quad (33)$$

(single subcarrier)

$$S_V(t)=R_{V1}C_{V1} \exp [j(\theta_{V1}+\phi_{V1})]+R_{V2}C_{V2} \exp [j(\theta_{V2}+\phi_{V2})]=K_{V1}+K_{V2}, \quad (34)$$

(single subcarrier)

where H1 represents the horizontal polarization state of user 1, etc. These complex values are sent to the polarimetric processor 122 as shown in FIG. 8. A function of the polarimetric processor 122 is to increase the C/I ratio between the two units, and exploits a dot-product to achieve this.

The polarization loss factor (PLF) between the intercepted electric field and the receiving antenna can be defined as $$PLF=10 \log |\hat{E}_i \cdot \hat{E}_a|^2 (\text{dB}) \quad (35)$$

where $\hat{E}_i$, $\hat{E}_a$ are unit vectors representing the polarization state of the incident field (which typically includes reflected components) and the polarization of the receiver antenna, respectively, and · represents the dot-product operation. In this example, the receiver knows its own polarization state and the polarization state of the second MU. There are several methods that can be used in the communication system so that the first MU knows the polarization states of other MUs. For example, during a beacon signal, an access point can identify polarization states assigned to mobile units that are active. Or, for example, the MU could have a table of polarization states of other MUs that is updated periodically. The baseband processing unit in the receiver of the first MU can generate complex second MU reference voltages in the reference and associated channels (these are nominally identified as horizontal and vertical, but note that an MU antenna set may be rotated with reference to the transmitting antenna, and that the antennas need not comprise orthogonally polarized antennas) such that the dot-product between the undesired signal and the second MU reference voltages equals zero. These complex voltages are also called the polarization vector, or cancellation vector To determine channel imperfections, the beacon signal can also include one or more channel correction pilot signals (that is, wave states that consist of modulation states formed from predetermined combinations of single modulation states that may include a polarization state), which are used by the MU to correct for the amplitude and phase imbalance introduced by the channel and rotation of the receiving antennas of the first MU. Some possible pilot structures are described below. The polarization filter uses this information to correct the received signals for channel imperfections before applying the cancellation vector.

A trade-off between the amount of undesired signal cancellation and the desired signal attenuation may be achieved by modifying the complex voltage levels of the cancellation vector. This type of processing may be used when the receiver generated noise is close to the desired signal value.

Prior to sending the signal into the polarimetric processor, channel correction is applied to the received symbols in both the reference and the associated polarized paths. In outbound (AP to MU) communication, the case being described here, both desired and undesired signals are affected in the same way by the channel. Therefore, $C^{H1}=C_{H2}$ and $\phi_{H1}=\phi_{H2}$, and the same is true for the vertically polarized channel. Assuming perfect channel equalization, a filtered value generated by the polarimetric processor is given by $$PP_O=[(K_{HC1}+K_{HC2})\hat{x}+(K_{VC1}+K_{VC2})\hat{y}]\cdot(K_{H2}^\perp \hat{x}+K_{V2}^\perp \hat{y}) \quad (36)$$

where the C subscript indicates that the symbol has been corrected for channel imperfections and the ⊥ superscript represents orthogonality between the: undesired signal and the complex values generated by the polarimetric processor (as determined according to equation (35). Indeed, Eq. (36) may be written as $$PP_O=(K_{HC1}\hat{x}+K_{VC1}\hat{y})\cdot(K_{H2}^\perp \hat{x}+K_{V2}^\perp y\hat{y})+(K_{HC2}\hat{x}+K_{VC2}\hat{y})\cdot(K_{H2}^\perp \hat{x}+K_{V2}^\perp \hat{y}) \quad (37)$$

$$PP_O=(K_{HC1}\hat{x}+K_{VC1}\hat{y})\cdot(K_{H2}^\perp \hat{x}+K_{V2}^\perp y\hat{y})=R_{H1} \exp [j(\theta_{H1})]\cdot K_{H2}^\perp + R_{V1} \exp [j(\theta_{V1})]\cdot K_{V2}^\perp \quad (38)$$

$PP_O$ is a best estimate of the received combined modulation state intended for the first MU transmitted by the AP, determined from a dot product of the vector, which is called the filtering vector, or cancellation state, and the corrected received signal. Notice, that the result of the polarimetric filtering process is a complex scalar equal to the sum of the received symbols in the reference and associated channels, modified by the orthogonal values for the second MU determined by the polarimetric processor. Since the first MU know the values of the cancellation state components for the undesired signal, but does not know if a received signal is intended for itself (the first MU), it could perform a dot product of the cancellation vector with each possible corrected transmitted polarization state (that is, each of the polarizations states assigned to all active MUs, modified by the known channel correction) and perform a maximum likelihood comparison of the channel corrected received signal with the multiplication results to determine the most likely transmitted polarization state. When more than one undesirable MU signal is involved, then the MU can determine a composite interfering state by vector addition of the interfering polarization states of the undesired signals, and using the composite interfering state, the polarimetric processor generates a cancellation vector for the composite interfering state and uses the cancellation vector as described above to determine the most likely transmitted polarization state. In accordance with an embodiment of the present invention, the minimum great circle distance on the Poincaré Sphere may be used to determine which state in the constellation or sub-constellation of combined modulation states identified with the first MU is closest to the $PP_O$ estimate of the received state intended for the first MU, and is therefore the most likely transmitted state. However, other distance metrics described herein above could be used. Thus, in FIG. 9, Polarization state mapping of the mobile unit (MU) is performed onto a polarization state that improves C/I relative to an interfering mobile unit. Note that the MU is mapped onto a single polarization state in one region. In accordance with an alternative embodiment, a polarization state of the filtered signal $PP_O$ is first determined (it is a best estimate of the received desired polarization state). It is used with a polarization constellation that that includes all the possible desired polarization states to determine, using a minimum distance metric, a most likely transmitted polarization state, which is then used to determine a best estimate of the received desired non-polarization modulation state or states, and this is used with a non-polarization constellation that that includes all the possible desirable non-polarization states to determine by a minimum distance metric a most likely transmitted non-polarization state.

It will be appreciated that the above description has been detailed for a case in which an AP is transmitting a signal that includes states for two MUs and the analysis is performed at the first MU, such that the signal for the second MU is an undesired signal. However, the same approach can be used to analyze signals received at an access point or a mobile unit when signals from multiple MUs are received simultaneously. In this case, the signal from the second or multiple other MU's are interfering undesired signals when an attempt to recover information from a first MU is being made. The benefits of the present invention will still accrue, but they may be somewhat diminished due to imperfect synchronization of signals received from different transmitters and from less perfect assessment of the amplitude and phase imbalance introduced by the various channels.

It will be further appreciated that more than one polarization state may be assigned to the first MU as a means to increase the bandwidth of data transfer to the first MU; in this instance, the most likely transmitted non-polarization modulation state for each of the plurality of polarization states assigned to the first MU can be determined by performing the data filtering operation for the non-desired signals as described above.

It will be further appreciated that some benefits of this embodiment of the present invention can be realized without correcting the received signal components, but using a filtering vector that is based on the known polarization state of the undesired signal(s).

Referring to FIG. 10, a graph having plots of a CDF (cumulative distribution function) for the PLF (as defined in Eq. (35)) of the desired signal show some simulated results of polarization state mapping for improving C/I between multiple user devices. Note that the worst-case is when the polarization state of the desired and undesired signals are restricted to the same region of the Poincaré sphere; in this case it might not be feasible to remove the undesired signal significantly, because the desired signal will also track it. The best case is when the desired and undesired signals are on opposite regions; in this case we have nearly 100% probability for PLF=10 dB. Since it is possible in this case to essentially completely reject the undesired signal, the receiver may decide whether to exploit the polarization state of the received signals, i.e., select a different polarization state such that the undesired signal is not completely cancelled, but the polarization loss factor (and signal-to-noise ratio) of the desired signal improves.

Referring to FIG. 11, another graph shows plots of simulations of the actual C/I improvement versus the number of undesired signals under the best case condition in which the desired and multiple undesired signals are on opposite regions. As is evident, the C/I improvement is reduced somewhat when four or more interferers are present. This suggests that this may be a practical limit on the number of undesired signals that can be processed under this condition. However, it should be noted that it is still possible to support multiple user devices by appropriately handling the undesired signals. This is treated next, wherein the actual polarization state assignment is performed in relation to the number of user devices and channel conditions in the system.

The results provided in FIG. 10 were obtained under the assumption that there was only one undesired signal and its power was equal to the desired signal power. The placement of the polarization states of user devices on the Poincaré sphere can take the required C/I ratio, receiver generated noise level and the received power of both the desired and an undesired signal generated by an interfering MU into account. The technique to accomplish this is to select a polarization state for the first MU that is orthogonal to the PS of the interferer via $$\hat{E}_i \cdot \hat{E}_d = 0 \qquad (39)$$

where $\hat{E}_i$, $\hat{E}_d$ represent the polarization states of the interfering and desired signals, respectively. It can be shown that (41) can be satisfied by using $$\hat{E}_{dH}{}^* = \hat{E}_{iV}, \hat{E}_{dV}{}^* = \hat{E}_{iH} \qquad (40)$$

where the subscripts H and V denote the reference and orthogonal polarization components, respectively, and the * denotes the complex conjugate operation. When only a single interferer is present, it is theoretically possible to make C/I approach infinity. However, the polarization loss factor of the desired signal should also be determined so that a best compromise can be made between the signal-to-noise ratio (SNR) at the receiver and the C/I ratio.

Figure 12:
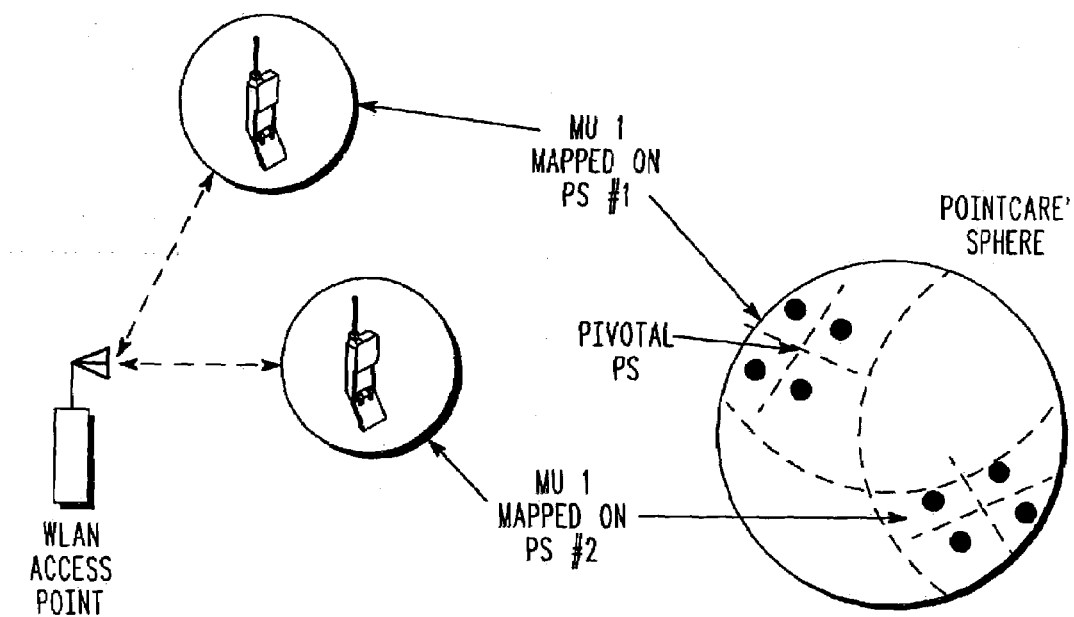
FIG. 12 illustrates a polarization state mapping onto a Poincaré sphere in a communication system that is consistent with certain embodiments of the present invention.

Referring to FIG. 12 a Poincaré sphere is marked to show a case wherein a sub-constellation (subset) of polarization states for one mobile unit is mapped into a region on the Poincaré sphere. In this case, the mapping is done in relation to a pivot polarization state (which could be the center of the sub-constellation, as shown in FIG. 12, or it could be one of the sub-constellation points), which can be chosen such that the C/I ratio among multiple user devices is increased resulting in a system with higher capacity. Polarization state translations around the pivot polarization state can be accomplished by multiplying the complex voltages determined for the combined modulation state at the pivot polarization state, prior to the FFT operation, by one of a set of N offset complex voltages, wherein the offset complex voltages have been determined to translate the pivot polarization state by an amount $\Delta\gamma_n$, $\Delta\delta_n$. In another technique, the sub-constellation includes the set of pivot polarization states and the translated polarization states, and an indexing scheme allows selection of a translated polarization state using a result of the C/I analysis. Thus, FIG. 12 shows polarization state mapping of the mobile unit (MU) onto one of a subset, or sub-constellation of polarization states in a region of the Poincaré sphere that improves C/I relative to an interfering mobile unit. Note that the sub-constellation of the MU is mapped onto a region of the Poincaré sphere. In this example, the pivot polarization state is in the center of the sub-constellation. This technique may also be described as selecting a polarization state that is associated with a user device from a subset of a constellation of polarization states, wherein the polarization states in the subset are determined by incremental changes to the polarization defining parameters of a pivot polarization state for the user device. The incremental changes can be dependent on the C/I ratio at the user device for a plurality of user devices, and may be dependent upon received power level at one or more of the user devices, and the quantity of the interfering devices.

An alternative procedure to use polarization states to simultaneously transmit data to more than one user is the use of a Tabular Decoder. In this technique, the information for each user device is mapped into polarization states selected from a sub-constellation of polarization states assigned to each user device and a signal is transmitted. The signal can be modeled at each state time as the combination of the state selected for each user device. The polarization state of the composite signal is different from any polarization state of each individual signal.

Each user device's bit combination determines a state to be selected from the user's polarization sub-constellation. A table containing all possible user device bit and received polarization state combinations is stored in the receiver.

Then, after cancellation of undesired signals, the polarization state of the received signal is compared against all possible polarization states. The polarization state closest to the polarization of the received signal (using, for example, minimum great circle distance of the states on a Poincaré sphere) is selected. The decoded user bits are the bit combination corresponding to the selected polarization state.

Figure 13:
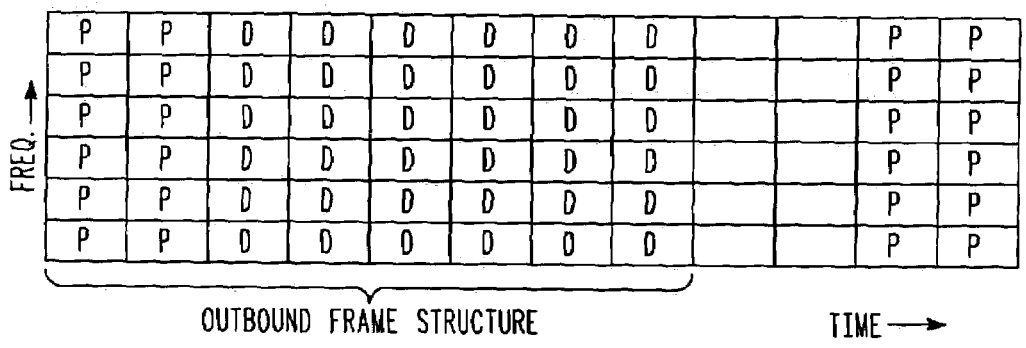
FIGS. 13 and 14 are illustrations of time division frame structures for two examples of pilot structures that can be used within a transmitted frame of a multicarrier communication system.
Figure 14:
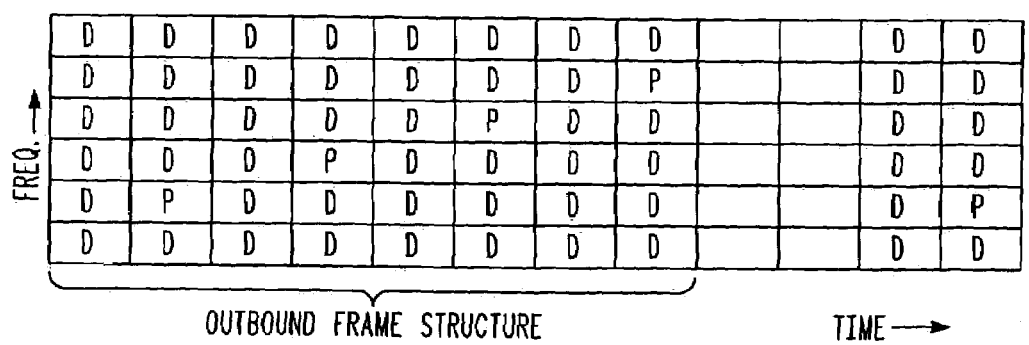

As in conventional modulation schemes, pilot symbols may be used in order to correct for degradations caused by the channel, but also can be uniquely used to correct for disorientation of the receiving antennas with reference to the transmitting antennas. The pilot structure will depend on the environment in which the system operates, and on the desired transmission efficiency. Referring to FIGS. 13 and 14, time division frame structures are shown for a plurality of sub-channels for two examples of pilot structures that can be used within a transmitted frame of a multi-carrier communication system, with the letter D denoting data and P denoting pilots. The time slots and sub-channel structure can be of the types that are used in OFDM systems. Empty slots can be used by the receiver to determine if there is an interfering signal present and to estimate its polarization state. FIG. 13 shows polarization pilots used initially to estimate the channel and the channel is assumed to be static for remainder of transmission (similar to quasi-static assumption in 802.11a. The pilot structure of FIG. 14 shows polarization pilots distributed in both time and frequency and may be suitable for high-mobility applications wherein the polarization dynamics of the channel change rapidly with time. Thus, in both instances, the state time (slot time) is a pilot state time and the wave state comprises a polarization state selected from the polarization constellation and combined with a frequency state. Polarization state mapping processes for C/I improvement have been described above. A technique for communication between MUs and an AP that involves determining the polarization state of multiple users and an assignment process is now described that improves system capacity. In this case, the emphasis is not so much on the modulation or how the polarization states are mapped (i.e., to a single PS, or to a pivot PS for the constellation option). Instead, the focus is primarily on the communication between multiple MUs (mobile units) and a single AP (access point), and how the user devices are assigned to their respective states for enhanced system capacity using polarization state mapping.

Figure 15:
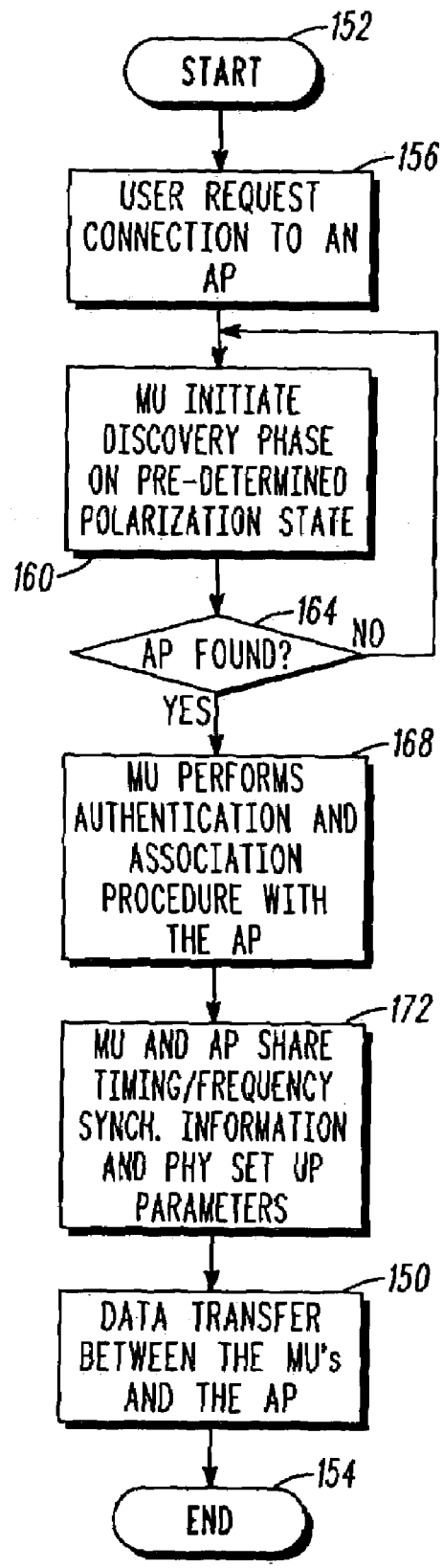
FIG. 15 is a flow chart depicting an exemplary protocol for communication between MUs and the AP in a manner consistent with certain embodiments of the present invention.

Referring to FIG. 15, a flow chart of the communication process is shown in accordance with an embodiment of the present invention. With the exception of block 150 (where the transferring of information takes place between the AP and the MUs using dedicated polarization states) any other communication between the AP and the MUs can take place, for example, on a conventional vertically polarized channel. The MAC (medium access control) layer described here is very similar to the IEEE 802.11 MAC. Both are based on CSMA/CA (carrier-sense multiple access with collision avoidance). The uniqueness of the present invention is one of the main focuses of this description.

In this communication process, starting at 152, a user device requests a connection at 156. The MU (the user device) initiates a discovery phase on a channel having a single predetermined polarization state. When an AP is found at 164 in this discovery phase, the MU performs an authentication and association procedure with the AP at 168. The MU and AP share timing and frequency synchronization information and set up physical layer parameters at 172, including a polarization state associated with the MU used for the transfer of the data. Data transfer between the AP and the MU can then proceed at 150. The process ends at 154.

Figure 16:
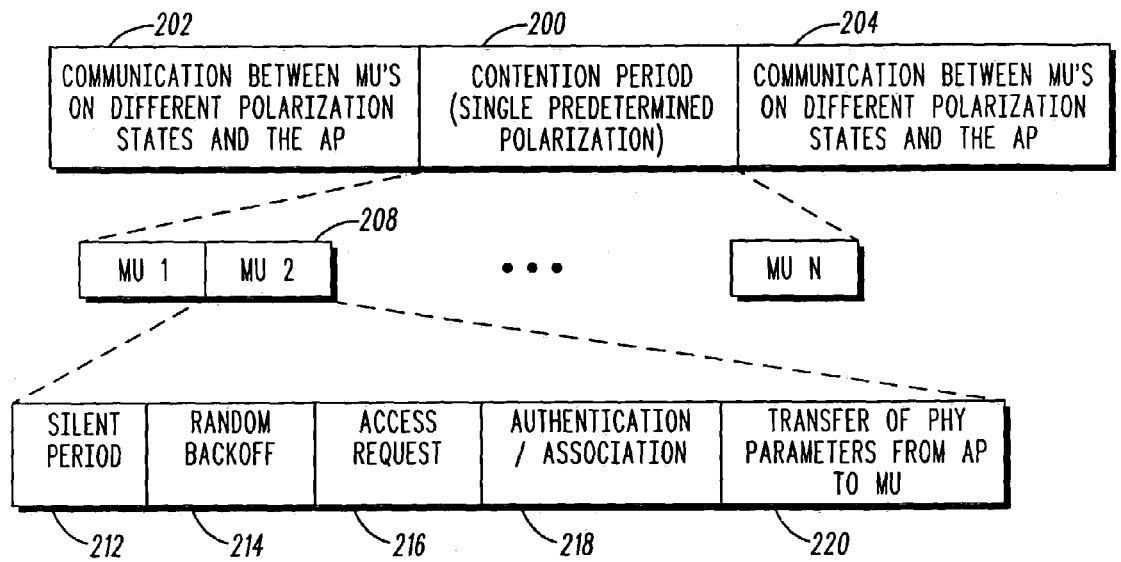
FIG. 16 is a timing diagram that illustrates a frame structure and contention slots suitable for use in certain embodiments of the present invention.

Referring to FIG. 16, a timing diagram illustrates the frame structure and contention slots for multi-user support exploiting polarization states in accordance with the embodiment of the present invention described with reference to FIG. 15. As illustrated, a contention period 200 occurs between adjacent communication periods for communication between MUs of different polarization states and the AP at 202 and 204. During the data transferring period 150 of the current exemplary embodiment, a conventional 802.11 MAC is able to support just one user. Through the use of polarization state mapping, the unique MAC frame depicted in FIG. 16 is able to support multiple users during the same period of time and on the same frequency, using polarization states associated with each user device to identify a combined modulation state for each user device identified by the polarization state. The length of the contention period is optimized such that multiple user devices are allowed to access the channel simultaneously. This option is not present in the current 802.11 MAC standard. In the unique system described here, a channel is defined by three parameters; a time slot, a center frequency and a polarization state. During the contention period 200, and more specifically, during the transfer of PHY (physical) layer information between the MUs and the AP at step 172

(see FIG. 15), the following parameters may be made available to the MUs by transmission of information from the AP:

Time synchronization AP→MU.
Frequency allocation AP→MU.
Polarization state (outbound/inbound) comm. AP→MU.
Contention period length AP→MU.
Coding rate AP→MU.
Modulation format AP→MU.

The AP can be placed in charge of assigning polarization states for both outbound (AP→MU) and inbound (AP→MU) communication. The selection of polarization states could be based on: received power level, required C/I ratio and the number of users in the system, or other parameters. The AP can thus set an optimal trade-off between contention slots and number of user devices supported. The number of contention slots can be a function of time of day (with fewer numbers during late night hours having little traffic), as well as a function of a sampling of the number of user devices the AP has supported for a given number of communication frames. Note that the AP can exercise a high throughput option if a single MU is available, thereby reducing the length of the communication frame since the available polarization states are used to implement the increased data-rate functionality. In other words simultaneous polarization slots can be assigned to a single user instead of multiple time slots.

During the contention periods such as 208, one suitable protocol uses a silent period 212 followed by a random back off period 214. An access request is communicated at 216 followed by authentication and association. Then, the physical layer parameters are transferred from the AP to the MU at 220 as described above.

Thus, one aspect of a carrier-sense multiple access, collision avoidance communication system is that during the transferring period 202, 204 user identifiable data symbols for a plurality of devices may be transmitted simultaneously during a state time.

At this point it is useful to emphasize that polarization pilots can be used to correct for the depolarization effects of the medium. These polarization pilots can be used by the MU to inform the AP of its received polarization state, and vice versa. The most likely non-polarization state is determined quite similarly to the technique described with reference to FIG. 9, and equation (36) above.

The polarization state techniques discussed above can be used as another degree of freedom in development of any number of communication scenarios. Several such scenarios are discussed below with the understanding that the specific embodiments disclosed below are not to be considered limiting, but rather should be considered exemplary of the many possibilities that can occur to one skilled in the art upon consideration of these teachings.

Polarization State Division Multiple Access (PSDMA) Base on Polarization State Hopping (PSH)

Multiple access schemes are used for the sharing of limited channel resources among multiple users. In collision avoidance systems, a single user device utilizes essentially the full resources of the channel. In this section, two different categories of polarization state hopping (PSH), referred to as pseudo noise generator based (PN-PSH) and direct sequence (DS-PSH) are considered.

PN-PSH (Pseudo Noise-Polarization State Hopping)

Figure 17:
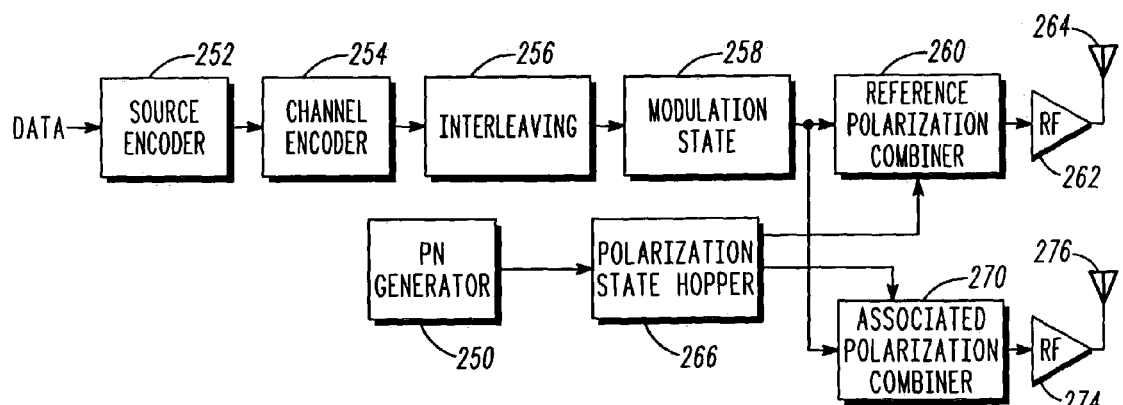
FIG. 17 is a block diagram that illustrates an exemplary pseudo-noise polarization state hopping (PN-PSH) transmitter consistent with certain embodiments of the present invention.

Referring to FIG. 17, a block diagram of an exemplary PN-PSH transmitter 1700 is depicted, in accordance with an embodiment of the present invention. In this PN-PSH transmitter 1700, data are supplied to a source encoder 252 and a channel encoder 254 that supply suitable data encoding. Source encoder 252 takes analog signals and converts them into a sequence of symbols or bits. The channel encoder 254 adds redundancy to the input bits for error correction purposes. An interleaver 256 interleaves the data to combat the effects of burst noise and interference. The data from interleaver 256 are then used to determine anon-polarization modulation state (e.g., an amplitude/absolute phase state) at modulator 258 and the modulation state components of the non-polarization modulation state are combined with components of a polarization state by reference and associated polarization state combiners 260, 270. The modulator 258 may be described as performing a function analogous to the selection of a modulation state from the $\psi$ constellation 414 of mapper 410 (see FIG. 4) and the reference and associated polarization state combiners 260, 270 may be described a performing a function analogous to the combining function 416 of the mapper 410. Once mapped to reference and associated polarization states, the signals are processed by an RF section including complex modulators and power amplifiers 262, 274, and transmitted via antennas 264, 276 The state of the PN-sequence generator 250 in the transmitter 1700 of FIG. 17 is used to determine the polarization state of the signal. PN generator 250 provides a pseudorandom number to polarization state hopper circuit 266 that provides polarization state information to the reference and associated polarization state combiners 260, 270. To generate the desired wave states, two paths are used: a reference path comprising reference polarization combiner 260, RF section 262, and antenna 264, and an associated path comprising associated polarization combiner 270, RF section 272, and antenna 274. The gain and the phase of each path are therefore determined by a pseudorandom number generated by a pseudo noise sequence (PN generator block 250) and the output of the modulator 258. Antenna 264 may, for example, be horizontally polarized, while antenna 276 is vertically polarized, but other non-orthogonal antenna configurations can also be used. It will be appreciated that the reference and associated polarization combiners 260, 270 could be combined as one table, or one set of calculations.

The total number of polarization states generated is given by $$N=2(2^m-1) \tag{41}$$

where N and m are the number of polarization states and the number of shift register stages used to generate the PN sequence, respectively. For one value of m, there may be a plurality of pseudo noise generators that generate different sequences. Different PN sequence generators of the same length m or differing lengths may be used in the transmitter for accomplishing polarization hopping of non-polarization modulation states identifying data for different user devices.

At each of N hop times during each non-polarization modulation state time, the PN generator 250 feeds a sequence of bits that define a chip into the polarization state hopper 266. The hopper 266 selects the polarization state corresponding to the fed chip sequence and passes the corresponding complex polarization components to the reference and associated polarization state combiners 260 and 270. The data information is therefore transmitted with the pseudo randomly selected polarization state. One approach to demodulation at the receiver is to use majority rule logic, i.e., a symbol is decoded if at least (N+1)/2 chips have the same combined modulation state.

The type of PN-PSH system where polarization hopping rate is faster than symbol rate is called fast hopping. On the other hand in slow hopping PSH, the polarization state is changed every symbol time, or more slowly (the polarization hopping rate is slower than the symbol rate).

The technique of fast hopping can be further described as modulating a radio signal transmitted from two polarized antennas during N state times in which N wave states of the radio signal are based on a sequence of N polarization states selected from a constellation of polarization states comprising at least three polarization states combined with a non-polarization modulation state. The non-polarization state quantifies a set of data symbols that are a portion of the information associated with a user device. Each of the sequence of N polarization states is selected from the constellation using a pseudorandom number generated by a pseudo noise sequence generator associated with the user device (the N polarization states are not necessarily all different, since they are selected pseudo randomly). The pseudorandom number is synchronously generated in the receiver of the user device and used to duplicate the sequence of polarization states, and thereby recover the data symbols from the non-polarization modulation state.

The technique of slow hopping can be further described as modulating a radio signal transmitted from two polarized antennas during N state times in which N wave states of the radio signal are each based a polarization state selected from a constellation (P) of polarization states combined with one of N non-polarization modulation states. The (The N non-polarization states are not necessarily differing states.) The N not necessarily differing non-polarization modulation states are determined from a set of data symbols associated with a user device. N not necessarily differing non-polarization modulation states are determined from a set of data symbols associated with a user device. The polarization state is selected from the constellation using a set of bits generated by a pseudo noise sequence generator associated with the user device. The pseudo noise generator sequence is synchronously generated in the receiver of the user device and used to duplicate the polarization state, and thereby recover the data symbols from the N non-polarization modulation states.

Figure 18:
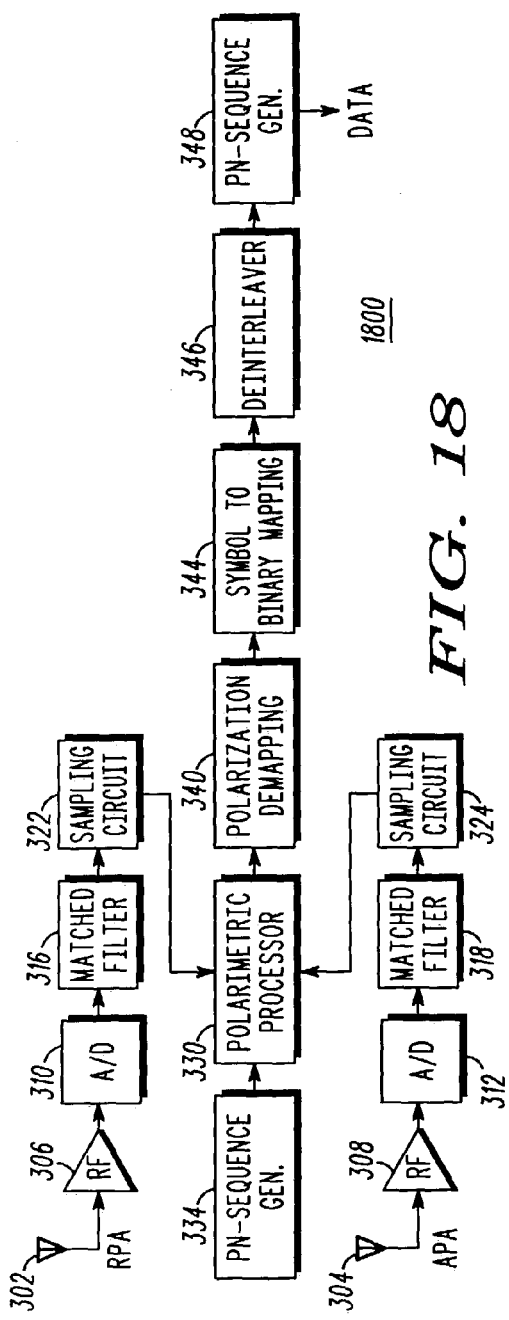
FIG. 18 is a block diagram that illustrates an exemplary PN-PSH receiver consistent with the PN-PSH transmitter described with reference to FIG. 17.

Referring to FIG. 18, a block diagram of an exemplary PN-PSH receiver 1800 is shown which carries out an inverse operation of the PN-PSH transmitter 1700 shown in FIG. 17. RF signals are intercepted at antennas 302 and 304, which are preferably orthogonally polarized (horizontally and vertically polarized, for example). The RF signals are processed by RF receiver circuits 306 and 308 respectively to produce baseband signals that are then converted to digital using A/D converters 310 and 312. The digitized outputs of AND converters 310 and 312 are processed in matched filters 316 and 318. Matched filters 316 and 318 are special filters whose characteristics are matched to those of the incoming signal to maximize the output peak signal to average noise power ratio.

The filtered outputs from 316 and 318 are sampled at sampling circuits 322 and 324 respectively and the sampled signals are processed by a polarimetric processor 330. Polarimetric processor 330 corrects the sampled signals for an angle rotation between the transmitted and received signals, which may be caused by an angular offset between the transmitting and receiving antennas, or by reflections of the wave during passage from the transmitter to the receiver 1800. This is preferably done by a measurement of a pilot signal from the transmitter 1700. Polarimetric processor 330 receives a PN sequence from PN sequence generator 334 that corresponds to the PN sequence of the PN generator 250 of the device transmitting the intercepted RF signal and supplies an output signal to polarization de-mapper 340, which uses the PN sequence to select the transmitted polarization state from a constellation or sub-constellation that has the same PN sequence to polarization state mapping as the one used by the transmitter 1700, and uses the selected polarization state to recover the amplitude/absolute phase modulation states, using equations (17) modified to include an angle of rotation, β, between the transmitting and receiving signals. Once the polarization state de-mapping is completed by the polarization de-mapper 340, output symbols are mapped to binary at symbol to binary mapper 344. Binary data can then be de-interleaved and decoded by de-interleaver 346 and decoder 348 respectively to recover the transmitted data.

DS-PSH (Direct Sequence-Polarization State Hopping

In this polarization state hopping scheme each data bit interval is divided into N chips. Let $c=(c_1 \ c_2 \ldots c_N)$ denote a PN sequence where $N=2^n-1$ and n is the number of shift registers stages used to generate the PN sequence. Each input data bit is manipulated with a PN sequence to arrive at a chip sequence. The simplest form of manipulation is exclusive OR operation. In this case, the resulting chip sequence is given by $$a_{k,i}=d_k \oplus c_i \qquad (42)$$

where $a_{k,i}$, $d_k$ and $c_i$ denote the $j^{th}$ output chip corresponding to the $k^{th}$ data bit, and $j^{th}$ chip of the PN sequence. In the more general case, a mapping of a chipset to a polarization state is defined (see three examples below). The polarization state of the transmitted signal is thus changed on a chipset-by-chipset basis in a pseudorandom manner determined from the map by the output chip sequence. The chipset may be a short as one chip long (as in example 1, below) or as long as the set of chips forming a data bit.

Figure 19:
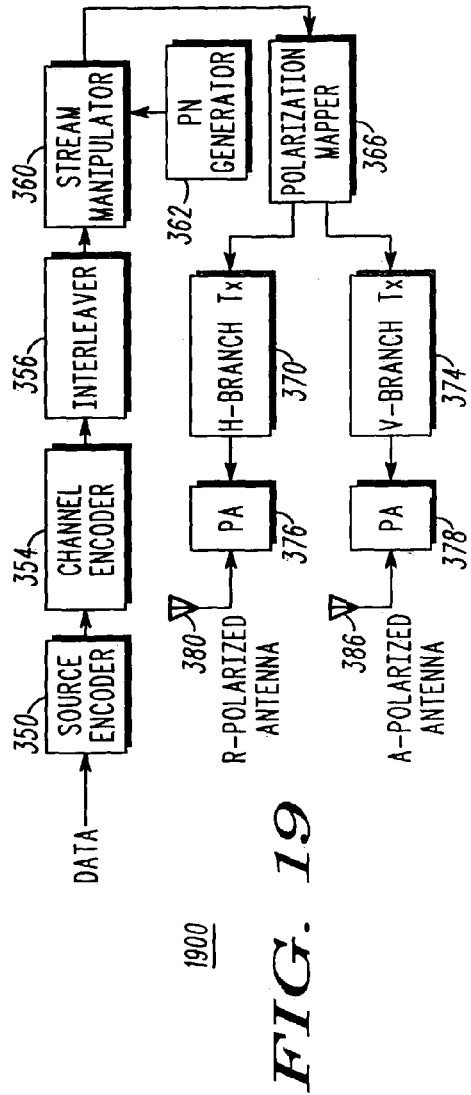
FIG. 19 is a block diagram that illustrates an exemplary direct sequence polarization state hopping (DS-PSH) transmitter block diagram consistent with certain embodiments of the present invention.

In this scheme polarization codes (a sequence of polarization states selected from a constellation of polarization states by a number generated by a unique PN sequence generator for each user device) are assigned to user devices. Each user device utilizes its polarization code to modulate the information and to demodulate the information using a correlation process. Referring to FIG. 19, a block diagram of an exemplary DS-PSH transmitter 1900 is shown wherein data are received at a source encoder 350. The source encoded data are then encoded by channel encoder 354. The encoded data from channel encoder 354 are processed by an interleaver 356 and then passed to a stream manipulator 360 that also receives a PN sequence from PN generator 362. Stream manipulator 360 functions in accordance with equation (42). In its simplest form, the stream manipulator 360 performs a modulo 2 addition of incoming bits with the PN sequence bits, but other embodiments are also possible without departing from the invention, including embodiments in which complex modulation states are manipulated by the PN sequence.

The output of stream manipulator 360 is mapped to polarization states at polarization mapper 366. Polarization mapper 366 supplies a horizontal polarization mapped signal to transmitter 370 and a vertical polarization mapped signal to transmitter 374. Transmitters 370 and 374 convert their respective inputs to RF and pass those signals to RF power amplifiers 376 and 378 respectively for transmission over horizontally polarized antenna 380 and vertically polarized antenna 386 respectively.

Figure 20:
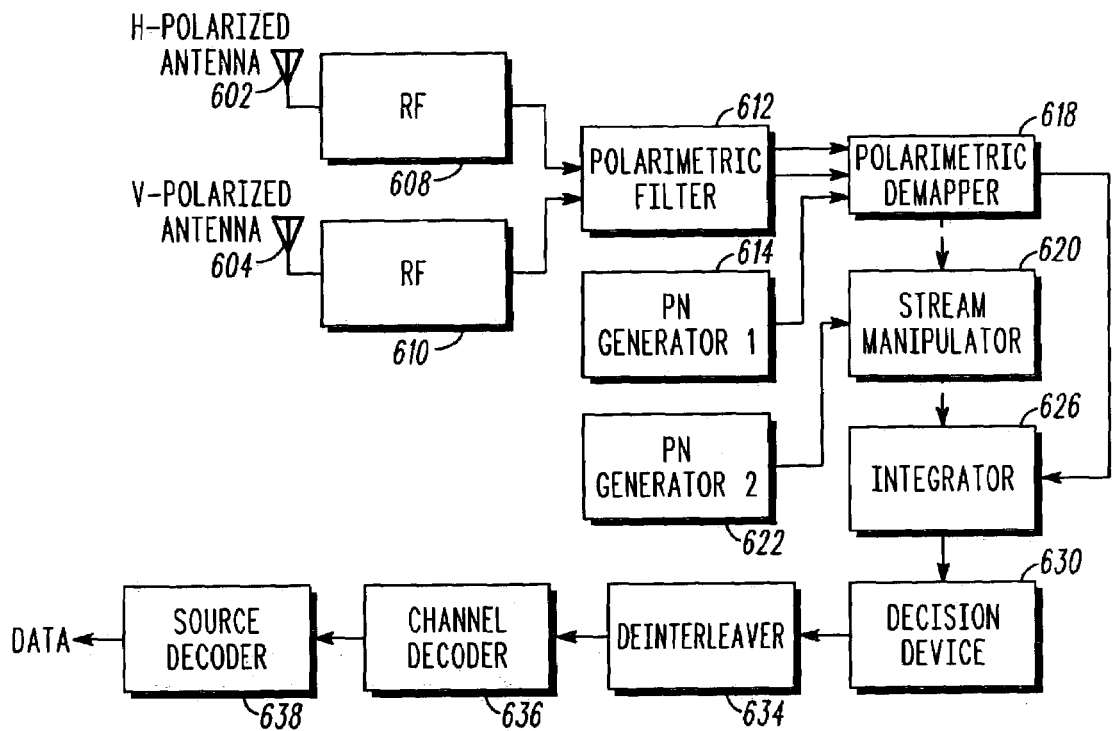
FIG. 20 is a block diagram that illustrates an exemplary DS-PSH receiver consistent with certain embodiments of the present invention.

Referring to FIG. 20, a block diagram of a DS-PSH receiver 2000 that can reverse the process carried out in the transmitter of FIG. 19. Horizontally polarized RF signals are intercepted at antenna 602 while vertically polarized RF signals are intercepted at antenna 604. These signals are respectively processed by RF sections 608 and 610 that may include low noise amplifiers, filters and frequency conversion circuits. The baseband outputs of these RF sections 608 and 610 are supplied to a polarimetric filter 612 that converts analog signals from the RF sections to digital samples and performs the functions of channel impairment correction and undesirable signal reduction as described above. The resulting filter digital components are coupled to a polarimetric demapper 618 that also accepts inputs from a first PN generator 614 that generates the same PN code used by the PN generator 362 of the transmitter 1900. The polarimetric demapper 618 uses the PN code to remove the polarization states and generate a stream of received chipsets comprising chips that represent the chips of the original data symbols (bits, in the examples below) coupled to the stream manipulator 360 of the transmitter 1900, but for uncorrected errors that had been induced in the received radio signal. The output of chips from polarimetric demapper 618 is integrated at integrator 626 that carries out an integration, or accumulation function. The output of integrator 626 is passed to a decision device that converts an analog sample into a symbol forming a part of the alphabet of symbols in use in the particular embodiment of interest. The recovered data are de-interleaved at 634, and decoded at decoders 636 and 638.

In yet another embodiment in which DS coding and PN-PSH are both used, a second PN-sequence generator 614 and a stream manipulator are included in the receiver 2000. Two PN-sequences are required in this combination of DS with PN-PSH. This combination is accomplished in a transmitter, for example, by including the PN generator 250 of transmitter 1700 as a second PN generator in the transmitter 1900, with the output of the second PN generator coupled to the polarization mapper 366 for generating polarization hopping states. In this embodiment, the first PN generator 362 of the transmitter 1900 generates a PN code that is used to generate conventional PN manipulated DS chips. These are coupled to the polarization mapper 366, which uses the second PN generator sequence to combine the DS chips with a hopping polarization state as described above with reference to FIG. 17.

The dual DS and PN-PSH can each use codes unique to a user device, providing additional interference protection. In the receiver 2000, the baseband outputs of the RF sections 608 and 610 are supplied to the polarimetric filter 612 which serves the function of correcting channel impairments and interference, as described above. Polarimetric filter 612 provides an output to the polarization demapper 618, which uses the PN state hopping sequence to remove the polarization hopping state. The resultant DS chips are coupled to the optional stream manipulator used in this embodiment, and the code sequence from the second PN sequence generator 622 is used to recover the received symbol chips, with the remainder of the receiver 2000 operating as described above.

A first example of DS-PSH is now described in which a PN code generator with two stages is utilized. The exemplary 3 chip long PN sequence associated with this two-stage generator is 101. (In general, M polarization states each capable of signaling 1 or 0 (or a multilevel symbol) can be employed.) In this example two polarization states (M=2), namely Vertical ($\gamma=90°$, $\delta=0'$) and Horizontal ($\gamma=0°$, $\delta=0°$) polarizations are employed where chips 1 and 0 denote Vertical and Horizontal polarizations, respectively. In this example, the chips and data bits are first manipulated by an exclusive OR function to generate a manipulated stream that is then used to select one of two polarization states. The polarization signal mapping is given in TABLE 3.

TABLE 3

| Manipulated Chip | Polarization state | $E_x$ | $E_y$ |
|---|---|---|---|
| 0 | H | $\cos(\omega t)$ | 0 |
| 1 | V | 0 | $\cos(\omega t)$ |

Subject to the input bit stream of 01 and fast PSH (3 hops per bit), the manipulated chip sequence will be 010101, and the signals transmitted on the horizontal and vertical paths will be { $\cos(\omega t)$, 0, $\cos(\omega t)$, 0, $\cos(\omega t)$, 0} as the reference (horizontal) wave signal and {0, $\cos(\omega t)$, 0, $\cos(\omega t)$, 0, $\cos(\omega t)$} as the orthogonal (vertical) wave signal.

The receiver is PN synchronized with the transmitter. The received signal is integrated over one cycle (three chips) of PN sequence to arrive at a bit decision.

In a second example of DS-PSH, the chip and bit values are used independently to select one of four wave states (the chip value is used to select a polarization state and the data bit selects an amplitude/absolute phase state). The wave state mapping is given in TABLE 4.

TABLE 4

| Data bit | Chip | $E_x$ | $E_y$ |
|---|---|---|---|
| 1 | 0 | $\cos(\omega t)$ | 0 |
| 0 | 0 | $-\cos(\omega t)$ | 0 |
| 1 | 1 | 0 | $\cos(\omega t)$ |
| 0 | 1 | 0 | $-\cos(\omega t)$ |

Subject to the same input bit stream of 01 and fast PSH (3 hops per bit), the transmitted signals on horizontal and vertical paths will be {0, $-\cos(\omega t)$, 0, 0, $\cos(\omega t)$, 0} as the reference (horizontal) wave signal and {$-\cos(\omega t)$, 0, $-\cos(\omega t)$, $\cos(\omega t)$, 0, $\cos(\omega t)$} as the orthogonal (vertical) wave signal In a third example of DS-PSH, four polarization states are used, namely Horizontal, Vertical, LP (Linear Polarization) at 45° and LP (Linear Polarization) at 135°. In this case, an exemplary PN cycle is 101101. Note that the PN cycle is twice as long compared to the previous case, as two chips instead of one represent each polarization state. The polarization mapping for this example is shown in Table 5. The bit state is used to select an amplitude/absolute phase state by inverting the values of the selected polarization ($E_x$, $E_y$).

TABLE 5

| Two chip Combinations | Polarization State | $E_x$ | $E_y$ |
|---|---|---|---|
| 01 | H | $\cos(\omega t)$ | 0 |
| 00 | V | 0 | $\cos(\omega t)$ |
| 11 | LP 45° | $\cos(\omega t)$ | $\cos(\omega t)$ |
| 10 | LP 135° | $-\cos(\omega t)$ | $-\cos(\omega t)$ |

For an input bit stream of 10, the transmitted signals will be:

{−cos(ωt), cos(ωt), cos(ωt), −cos(ωt), cos(ωt), −cos(ωt)} as the reference (horizontal) wave signal and {−cos(ωt), cos(ωt), 0, cos(ωt), −cos(ωt), 0} as the orthogonal (vertical) wave signal.

Note that the receiver is PN synchronized with the transmitter in all three examples. In terms of structure, the receiver for example three is identical to the previous two examples, but the integration duration is twice as long since a bit is transmitted within two cycles of PN sequence.

Hybrid PSH Multiple Access Schemes

Those skilled in the art will appreciate that Polarization State Hopping and the use of polarization states as an additional degree of freedom in communication systems can be advantageously utilized in many variations. By way of example and not limitation, the following multiple access schemes are described that combine polarization state hopping (PSH) with other MA methods: Hybrid Frequency Division Multiplexed PSH (FDM/PSH), Hybrid Time Division Multiplexed PSH (TDM/PSH), Hybrid Direct Sequence PSH (DS/PSH), Hybrid Frequency Hopping PSH (FH/PSH) and Hybrid Time Hopping PSH (TH/PSH).

For hybrid FDM/PSH (Frequency Division Multiplexed PSH) and hybrid TDM/PSH (Time Division Multiplexed PSH), the information for each user device is transmitted on non-overlapping channels in the frequency domain for FDM and in a distinct time slot for TDM. In the hybrid schemes introduced here, the polarization states are assigned to the frequency channels for FDM or time slots for TDM. More specifically, the polarization state of each FDM channel (or TDM slot) is determined by a PN generator. At the receiver a PN generator synchronized to the input PN generator is employed. This PN generator tracks the polarization state of each FDM channel (or TDM slot) and subsequently the information is decoded.

The FDM/PSH technique may be further described as including the following features: A polarization state is selected from the polarization constellation using a pseudo-random number from a PN sequence that is associated with a user device. A frequency channel associated with the user device is selected from a set of frequency channels. A non-polarization state based on a data symbol is formed using one of amplitude modulation, absolute phase modulation, and amplitude/absolute phase modulation. The polarization state, the frequency channel (frequency state), and the non-polarization state are combined to form a combined modulation state for the user device, which can be combined with combined modulation states for other user devices to form the wave state, thereby increasing data throughput in the system by sending data to multiple users in the frequency channel.

The TDM/PSH technique may be further described as including the following features: A polarization state is selected from the constellation using a pseudorandom number that is associated with a user device. A time division multiplexing time slot associated with the user device is selected from a set of time slots for transmitting the wave state. A non-polarization modulation state based on a portion of the information associated with the user device is formed using one of amplitude modulation, absolute phase modulation, and amplitude/absolute phase modulation. The polarization state and the non-polarization modulation state are combined to form a combined modulation state, which can be combined with combined modulation states for other user devices to form a wave state that are transmitted during the time slot, thereby increased data throughput in the system by sending data to multiple users in the same time slot.

Figure 21:
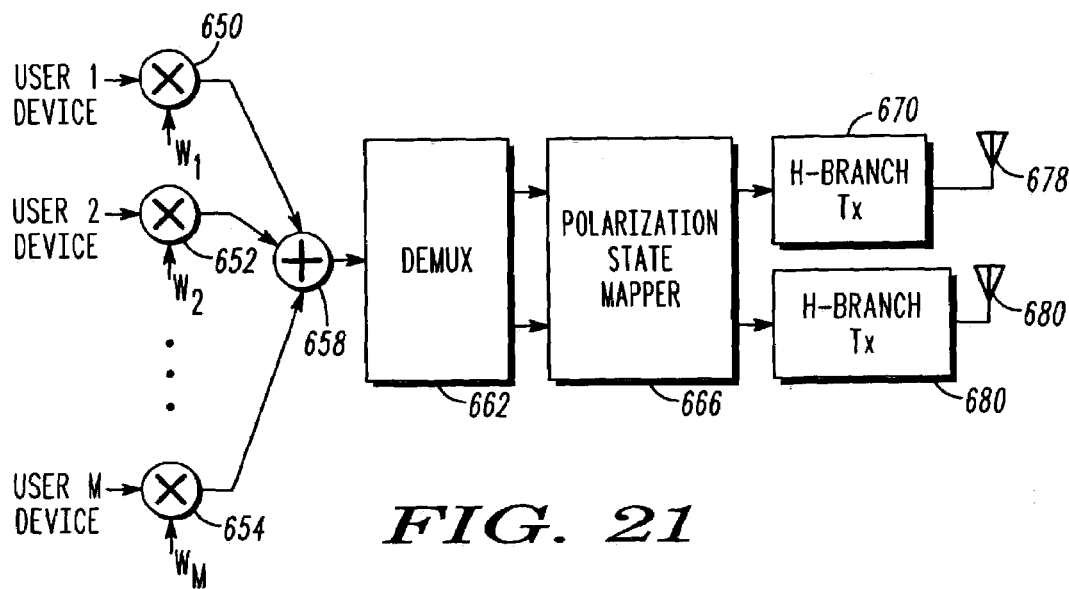
FIG. 21 is a block diagram that illustrates an exemplary hybrid DS/PSH transmitter consistent with certain embodiments of the present invention.

Referring to FIG. 21, a block diagram of a transmitter 2100 for transmitting hybrid DS/PSH (Direct Sequence PSH) modulated wave signals is shown, in accordance with an embodiment of the present invention. The system in this example is a synchronous direct sequence (DS) communication system with M user devices—user device 1 through user device M. The data for each use device is chipped with Walsh codes (W1 through WM) at functions 650, 652 through 654, resulting in a series of symbols with values −1 and 1, and the resulting sequences are at 658 and RF modulated. The dynamic range of the resulting sequence varies from −M to +M depending on the content of individual streams. Then the stream is de-multiplexed at demultiplexer 662 into two branches. A total of $(2M+1)^2$ possible polarization states are in the constellation of polarization states, and each chip pair is mapped to a polarization state at polarization state mapper 666 and transmitted using a horizontal polarized branch transmitter 670 and a vertical branch transmitter 680 over horizontally and vertically polarized antennas 678 and 680 respectively. The signal transmission has thus been achieved by a polarization hopping.

Figure 22:
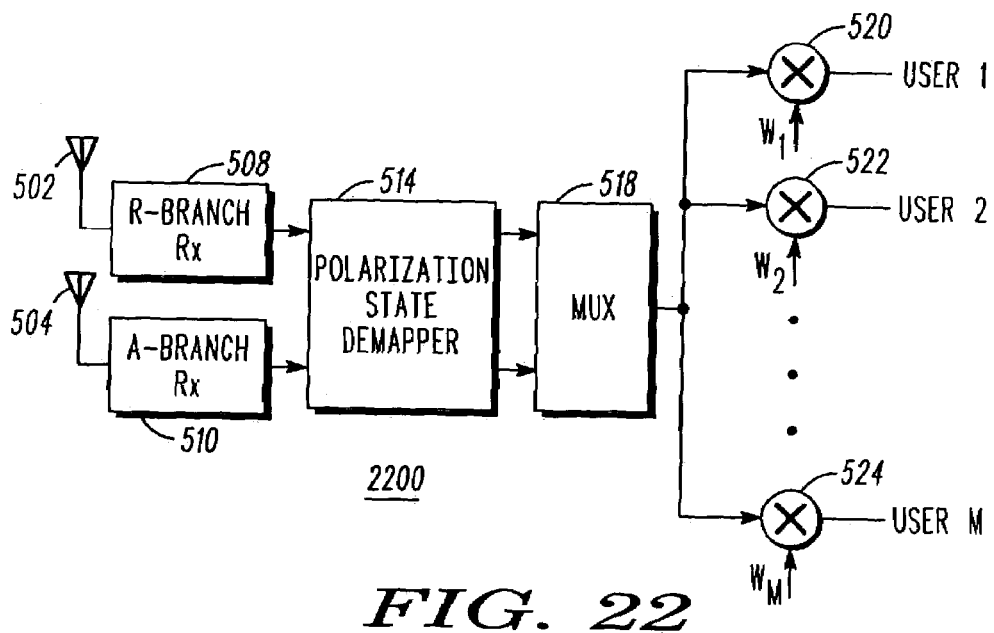
FIG. 22 is a block diagram that illustrates an exemplary hybrid DS/PSH receiver consistent with certain embodiments of the present invention.

Referring to FIG. 22, a block diagram of a receiver 2200 for receiving hybrid DS/PSH wave signals is shown, in accordance with the embodiment of the present invention described with reference to FIG. 21. At the receiver 2200, the transmitted signals are intercepted by horizontally and vertically polarized antennas 502 and 504 respectively, which pass the intercepted signals to a horizontal branch receiver 508 and a vertical branch receiver 510. The polarization state of each incoming chip is compared against all possible states at polarization state demapper 514 and the state with minimum distance (e.g., minimum great circle distance on the Poincaré sphere) from the received polarization is selected. The polarization state is inverse-mapped into voltages by the polarization state demapper 514 and the voltages are multiplexed by multiplexer 518 to form a direct sequence CDMA signal. This signal is then mixed with the Walsh codes $W_1$ through $W_M$ at 520, 522 through 524 to recover individual user bit streams for user device 1 through user device M (or, if the receiver 2200 is a single user device receiver, only one Walsh mixer is included).

Figure 23:
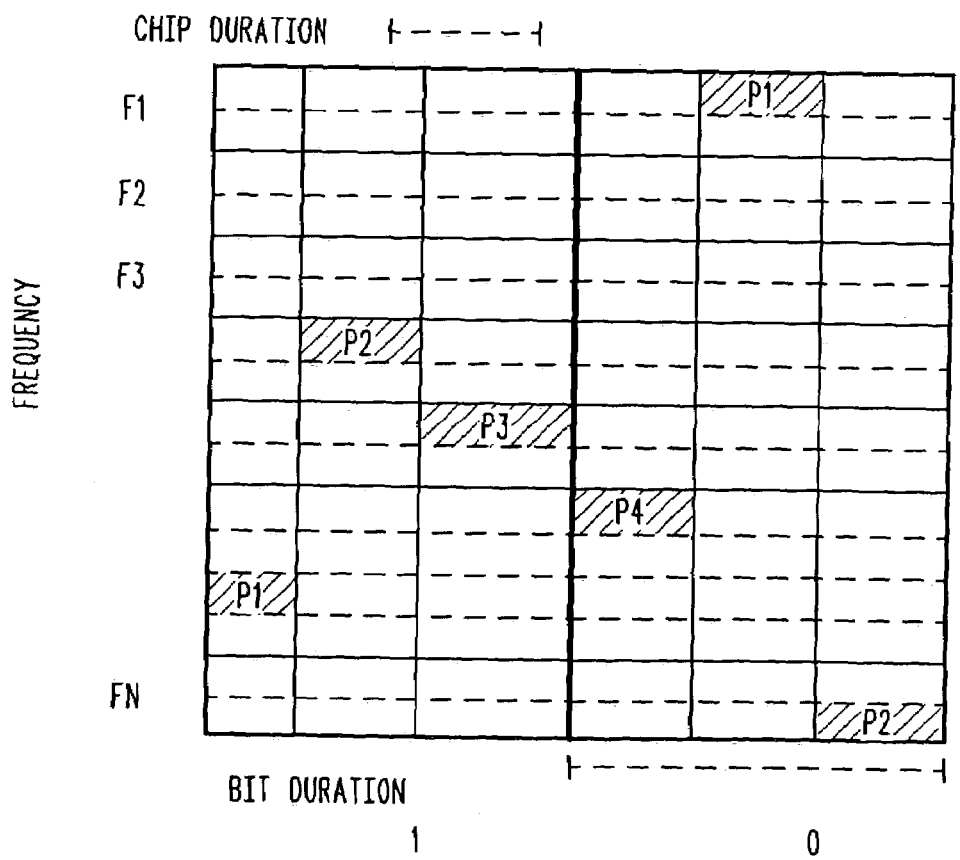
FIG. 23 is a plot of polarization state versus time that illustrates an exemplary FH/PSH hybrid MA bit sequence consistent with certain embodiments of the present invention.

Referring to FIG. 23, a plot of polarization state versus time for an exemplary hybrid FH/PSH system is shown, in accordance with an embodiment of the present invention. In addition to using a PN sequence to select the hopping frequency, FH/PSH (Frequency Hopping PSH) utilizes a pseudo-random polarization state determined based on a PN value (pseudorandom number) generated by a PN sequence generator. One could use either the same PN sequence generators or two different PN generators for frequency and polarization state hoppers. In the exemplary system plotted in FIG. 23, there are three frequency hops and three polarization states hops per data symbol, which in this example is a bit. Note that in general the number of frequency hops per bit and number of polarization state hops per bit do not necessarily need to be equal. This technique may be described as a technique in which the state time of the wave state is a data chip time. A polarization state is selected from the constellation of polarization states using a pseudorandom number. A frequency channel is selected from a set of frequency channels using a second pseudorandom number. A non-polarization chip state is formed using one of amplitude modulation, absolute phase modulation, and amplitude/ absolute phase modulation. The wave state is formed by combining the polarization state, the frequency state, and the chip state.

Figure 24:
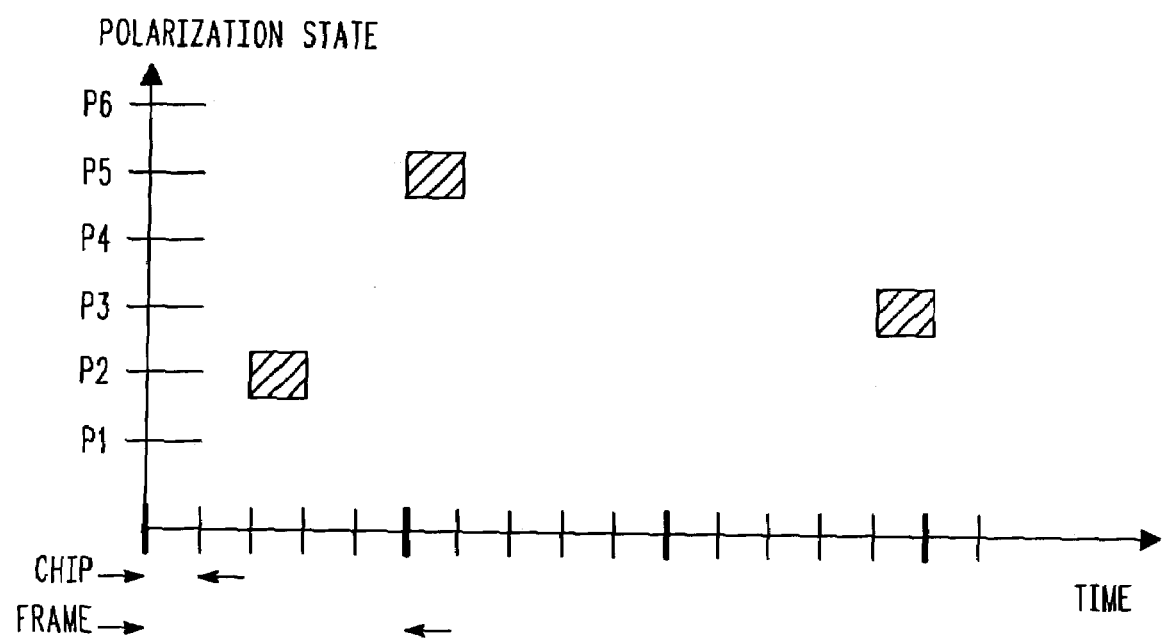
FIG. 24 is a plot of polarization state versus time that illustrates an exemplary TH/PSH hybrid MA bit sequence consistent with certain embodiments of the present invention.

Referring to FIG. 24, a plot of polarization state versus time slots is shown for an exemplary hybrid TH/PSH (Time Hopping PSH), in accordance with an embodiment of the present invention. A TH system transmits at a time slot within a frame, wherein the selected time slot is determined by a PN generator. Unlike TH, a TH/PSH system is equipped with two PN generators that generate PN sequences identified with a user device: one is responsible for the pseudorandom time slot selection within the frame and the other one selects a pseudorandom polarization state for each transmission. This technique can be described as determining a non-polarization state that is to be transmitted within a frame having a duration that is a multiple of the state time. A first pseudorandom number is generated by a first pseudo noise sequence generator associated with the user device. A polarization state is selected using the first pseudorandom number. A second pseudorandom number is generated by a second pseudo noise sequence generator that is associated with the user device. The wave state is determined by combining the selected polarization state with a non-polarization state that encodes data. The wave state is transmitted at a state time within the frame selected by using the second pseudorandom number.

In another embodiment according to the present invention, a state machine having memory stores combined modulation states generated according to embodiments of the present invention described above. The state machine (which may be a custom sequential logic circuit or a processor operating under stored program control), stores a sequence of M combined modulation states based on at least one previously selected polarization state that have been generated by one of the techniques described above, and performs a logical operation on the stored sequence to generate a memory encoded combined modulation state having reference and associated complex components that are used to generate the wave state. The logical operation is based on at least one of the stored sequence (i.e., one of the previous combined modulation states) that includes a polarization state. Examples of such memory encoding are convolutional coding and turbo coding. The stored sequence of combined modulation states may also be based on a currently selected polarization state or a currently determined combined modulation state. This state machine can be included in the transmitter 400 described with reference to FIG. 4 by including a state machine (not shown in FIG. 4) coupled to the polarization mapper 416 and to the RP and AP modulators 420, 425, and in comparable locations in the other exemplary transmitters described herein.

A receiver in a device for receiving the memory encoded combined modulation states may then include a state machine having memory that stores the received best estimated encoded combined modulation states, which are used to determine the most likely transmitted modulation state that represents the portion of the information associated with the user device in a maximum likelihood estimation process. The maximum likelihood estimation process used may be a Viterbi decoding process. This state machine can be included in the example described with reference to FIG. 6 by including a state machine decoder (not shown in FIG. 6) coupled to the polarization filter 485 and to the state demapper 486, and in comparable locations in the other exemplary receivers described herein.

In some of the above system embodiments, for example the transmitter 400 and receiver 600 described with reference to FIGS. 4-6 above, the transmitting device can be augmented to include a location function. The location can be obtained from one of several location identification mechanisms such as: information from a GPS (Global Positioning System) receiver, or information in a message received by the user device by wire or wirelessly, or by manual entry. The location may then be used to select a polarization state based on location, for example to convey location information to the receiving device. Alternatively, the location can be used to select a sub-constellation of polarization states, for example to use states that are known to be less degraded by the environment through which the signal travels or, for example, to use states that are more compatible (less interfering) with signals from other user devices used at the location. In such embodiments, a mobile device may convey the location information to an access point that may make a decision on which sub-constellation is to be used. In other embodiments, the polarization state values stored in the look up table can be a function of the time of day, for example to use states that are known to be less degraded by the environment through which the signal travels. The receiving device must be provisioned correspondingly—i.e., with the same constellations and the same location or time rules. Other variations will occur to those skilled in the art upon consideration of the present teachings.

The embodiments of the present invention described herein have been typically described in the form of electrical block diagrams. The functions of the blocks of the electrical block diagrams will preferably by accomplished by a mix of analog hardware circuits and components—such as radio frequency amplifiers, mixers, and antennas—and programmed processors, such as microprocessors, computers, or digital signal processors (with associated memory) in a mix that is chosen to optimize certain parameters of a fabricated product, such as cost, size, and power requirement It will be appreciated that the functions of the blocks can be alternatively interpreted as steps of a method that is accomplished by the hardware and described using the functions of the blocks. However, the invention should not be limited to require any programmed processing, since the present invention could be implemented using hardware component equivalents of the programmed processors, such as special purpose hardware and/or state machines.

The transmitters and receivers described herein can be included in any of a very wide variety of optoelectronic communication assemblies (i.e., those including either electronic or photonic circuits, or both), including consumer and commercial products ranging from sophisticated video cellular telephones, robots, and wireless computers, to inexpensive personal area networked devices such as headsets; and space and military products such as communication satellites and communication control systems.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "plurality", as used herein, is defined as two or more than two. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system. A "set" as used herein, means a non-empty set (i.e., for the sets defined herein, comprising at least one member), unless otherwise stated. A "subset" as used herein, means any non-empty portion of a set, and can include all members of the set.

What is claimed is:

1. A transmitter apparatus, comprising:
    a mapper that maps sets of data into a series of reference polarization mapper output components (RP(s)) and a corresponding series of associated polarization mapper output components (AP(s)), wherein a combination of each pair of the reference and associated mapper output components defines one of a series of wave states (WS(s)), each based on a polarization state ($P_j$) selected by the mapper from a constellation (P) of polarization states ($P_{j,j=1\ to\ J}$) comprising at least two non-orthogonal states;
    a first polarized antenna that transmits a reference radio signal that is modulated using the series of reference polarization mapper output component (RP(s)); and
    a second polarized antenna, having a polarization different than the polarization of the first polarized antenna, that transmits an associated radio signal that is modulated using the series of associated polarization mapper output component (AP(s)).

2. The transmitter apparatus according to claim 1, further comprising:
    an RP modulator that generates an RP modulated signal (RP(t)) from the component (RP(s));
    an AP modulator that generates an AP modulated signal (AP(t)) from the component (AP(s)); and
    RP and AP transmitters modulated respectively by the RP(t) and AP(t) modulated signals, that are each coupled to one of the first and second polarized antennas.

3. The transmitter apparatus according to claim 1, further comprising:
    a table that stores the polarization states of the constellation (P) of polarization states.

4. The transmitter apparatus according to claim 1, wherein the mapper selects the polarization state $P_j$ from a subset (P1) of the constellation of polarization states (P) corresponding to a first user device, based on a subset of a set of the data identified for delivery to the first user.

5. The transmitter apparatus according to claim 1, further comprising a pseudo noise generator, wherein the mapper selects the polarization state $P_j$ based a pseudorandom number generated by the pseudo noise generator corresponding to a first user device.

6. The transmitter apparatus according to claim 1, wherein the mapper selects the polarization state $P_j$ based on a subset of a set of data associated with a first user device and combines the subset of the set of data with a number derived from a pseudorandom number generated by a pseudorandom generator corresponding to the first user device.

7. The transmitter apparatus according to claim 1, wherein the mapper selects the polarization state ($P_j$) using a subset of a set of data.

8. The transmitter apparatus according to claim 1, wherein each polarization state ($P_j$) in the constellation (P) of polarization states comprises a reference polarization component ($RP_j$) and a corresponding associated polarization component ($AP_j$).

9. The transmitter apparatus according to claim 8, wherein each of the reference polarization mapper output components (RP(s)) is a reference polarization component ($RP_j$) from the constellation (P), and each of the associated polarization mapper output components (AP(s)) is the corresponding associated polarization component ($AP_j$) from the constellation (P).

10. The transmitter apparatus according to claim 8, wherein the first and second antennas are orthogonally polarized and complex coefficients of a reference polarization component ($RP_j$) and a corresponding associated polarization components ($AP_j$) in the constellation (P) are determined by:

$$RPI_j = \cos \gamma_j$$

$$RPQ_j = 0$$

$$API_j = \sin \gamma_j \cos \delta_j$$

$$APQ_j = \sin \gamma_j \sin \delta_j$$

wherein $RPI_j$ is an in-phase value and $RPQ_j$ is a quadrature value of the reference polarization component ($RP_j$); $API_j$ is an in-phase value and $APQ_j$ is a quadrature value of the associated polarization component ($AP_j$); $y_j$ is determined by arctan ($E_{2j}/E_{1j}$); $E_{1j}$ is a maximum instantaneous voltage in one of the antennas; $E_{2j}$ is a maximum instantaneous voltage in the other of the antennas; and $\delta_j$ is an instantaneous polarization-phase angle by which $E_{2j}$ leads $E_{1j}$.

11. The transmitter apparatus according to claim 1, wherein the wave state (WS(s)) is determined by the mapper from the polarization state ($P_j$) selected from the constellation (P) of polarization states and an amplitude/absolute phase state ($\psi_m$) selected from a constellation ($\psi$) of amplitude/absolute phase states ($\psi_{m,m=1\ to\ M}$).

12. The transmitter apparatus according to claim 11, wherein each amplitude/absolute phase state ($\psi_m$) in the constellation ($\psi$) of amplitude/absolute phase states is stored as an in-phase value ($I_{\psi m}$) and a quadrature value ($Q_{\psi m}$).

13. The transmitter apparatus according to claim 11, wherein the first and second antennas are substantially orthogonally polarized and each reference polarization mapper output component (RP(s)) and each corresponding associated polarization mapper output component (AP(s)) is determined by:

$$RPI(s_{=i}) = |E_i| \cos \gamma_i \cos \phi_i$$

$$RPQ(s_{=i}) = |E_i| \cos \gamma_i \sin \phi_i$$

$API(s_{s=i}) = |E_i| \sin \gamma_i \cos(\phi_i + \delta_i)$ $APQ(s_{s=i}) = |E_i| \sin \gamma_i \sin(\phi_i + \delta_i)$ wherein $RPI(s_{s=i})$ is an in-phase value and $RPQ(s_{s=i})$ is a quadrature value of the reference polarization component of the wave state for state time i ($WS(s_{s=i})$); $API(s_{s=i})$ is an in-phase value and $APQ(s_{s=i})$ is a quadrature value of the associated polarization component of the wave state ($WS(s_{s=i})$); $|E_i|$ is a magnitude of a selected state of the constellation ($\psi$) of amplitude/absolute phase states, $\phi_i$ is a absolute phase of the selected state of the constellation ($\psi$)) of amplitude/absolute phase states; $y_i$ is an amplitude related parameter of a selected state of the constellation (P) of polarization states and $\delta_i$ is an instantaneous polarization-phase angle of the selected state of the constellation (P) of polarization states.

14. The transmitter apparatus according to claim 11, wherein the polarization state ($P_j$) is selected based on a pseudorandom number generated by a generator corresponding to a user device and the amplitude/absolute phase state ($\psi_m$) is selected based on a subset of the set of data associated with the user device.

15. The transmitter apparatus according to claim 11, wherein the at least one amplitude/absolute phase state ($\psi_m$) is selected based on a pseudorandom number generated by a pseudorandom generator corresponding to a user device and the at least one polarization state ($P_j$) is selected based on a subset of the set of data associated with the user device.

16. The transmitter apparatus according to claim 1, wherein the at least two non-orthogonal polarization states comprise at least three polarization states.

17. A method of radio communication, comprising:
modulating a radio signal transmitted from two differently polarized antennas during a state time in which a wave state of the radio signal conveys information and is based on one or more polarization states selected from a constellation of polarization states comprising at least three polarization states;
generating a plurality of frequency channels, wherein each frequency channel has a unique one of polarization states; and
combining the plurality of frequency channels by frequency multiplexing to form the wave state.

18. A method of radio communication, comprising:
modulating a radio signal transmitted from two differently polarized antennas during a state time in which a wave state of the radio signal conveys information and is based on one or more polarization states selected from a constellation of polarization states comprising at least three polarization states;
generating the wave state by a combination of one or more combined modulation states, wherein each combined modulation state is formed from a polarization state and is determined at least partially from a portion of the information
forming a non-polarization modulation state from a portion of the information associated with a user;
selecting a polarization state that is associated with a user device; and
combining the non-polarization modulation state with the selected polarization state to form a user identifiable data symbol.

19. The method according to claim 18, wherein each of the combined modulation states is further formed from a non-polarization modulation state formed by combinations of one or more of a group of modulations consisting of amplitude, absolute phase, and frequency modulations.

20. The method according to claim 18, further comprising:
combining user identifiable data symbols for different user devices to determine the wave state.

21. The method according to claim 18, further comprising:
selecting the polarization state that is associated with a user device from the constellation of polarization states using one or more parameters associated with a set of user devices identified as potentially interfering user devices.

22. The method according to claim 18, further comprising:
selecting the polarization state that is associated with the user device from a subset of the constellation of polarization states, wherein the polarization states in the subset are determined by incremental changes to the polarization defining parameters of a pivot polarization state for the user device.

23. The method according to claim 22, further comprising:
selecting the polarization state that is associated with the user device using one or more parameters associated with a set of user devices identified as potentially interfering user devices that are in a group of parameters that consists of received power levels at one or more of the user devices, a required carrier to interference power ratio, and a quantity of the potentially interfering user devices.

24. The method according to claim 18, further comprising:
selecting the polarization state from the constellation of polarization states using one or more parameters associated with a user device that are in a group of parameters that consists of geographical location of the user device and a time of day.

25. The method according to claim 24, wherein the geographical location is determined by one of a location identification message received by the user device by wire or wirelessly, and manual entry, and a Global Positioning system receiver coupled to the user device.

26. The method according to claim 18, further comprising:
repeating the forming, selecting, and combining to form up to N user identifiable data symbols for each of a plurality of user devices;
combining a user identifiable data symbol for each of the plurality of user devices to form one of N sub-channel reference wave state components and one of N sub-channel associated wave state components; and
combining N sub-channel reference wave state components formed by repeating the combining of the user identifiable data symbol for each of the plurality of user devices, using Inverse Fast Fourier Transformation to generate complex reference and associated wave state coefficients; and
generating the modulated radio signal using the complex reference wave state coefficients and complex associated wave state coefficients.

27. The method according to claim 18, wherein the state time is during a data transferring period of a carrier-sense multiple access, collision avoidance communication system and user identifiable data symbols for a plurality of user devices are transmitted simultaneously during the state time.

28. The method according to claim 18, wherein predetermined polarization states associated with each of one or more user devices are identified to contending user devices during a contention period of the carrier-sense multiple access, collision avoidance communication system.

29. A method of radio communication, comprising:
modulating a radio signal transmitted from two differently polarized antennas during a state time in which a wave state of the radio signal conveys information and is based on one or more polarization states selected from a constellation of polarization states comprising at least three polarization states; and
assigning a polarization communication channel to a user device, wherein the polarization communication channel is associated with a unique one of the polarization states of the constellation of polarization states;
assigning at least three polarization communication channels channel to one or more user devices.

30. A method of radio communication, comprising:
modulating a radio signal transmitted from two differently polarized antennas during a state time in which a wave state of the radio signal conveys information and is based on one or more polarization states selected from a constellation of polarization states comprising at least three polarization states, wherein the wave state is one of N sequential wave states, further comprising:
determining a non-polarization modulation state that quantifies a portion of the information that is associated with a user device, the non-polarization modulation state having a duration of N state times;
generating a sequence of N pseudorandom numbers associated with the user device;
selecting a sequence of N polarization modulation states from the constellation using the sequence of N pseudorandom numbers; and
generating each of the N wave states by combining one of the sequence of N polarization modulation states with the non-polarization modulation state.

31. A method of radio communication, comprising:
modulating a radio signal transmitted from two differently polarized antennas during a state time in which a wave state of the radio signal conveys information and is based on one or more polarization states selected from a constellation of polarization states comprising at least three polarization states, wherein the wave state is a polarization state selected from the constellation of polarization states using a chipset of a data symbol that is a portion of the information, further comprising:
generating a pseudorandom number associated with the user device
selecting a polarization state from the constellation using a logical combination of the pseudorandom number and the chipset; and
generating the wave state as the polarization state.

32. A method of radio communication, comprising:
modulating a radio signal transmitted from two differently polarized antennas during a state time in which a wave state of the radio signal conveys information and is based on one or more polarization states selected from a constellation of polarization states comprising at least three polarization states;
selecting a first polarization state from the constellation using a pseudorandom number that is associated with a first user device;
selecting a first frequency channel associated with the first user device from a set of frequency channels;
forming a first non-polarization state based on a portion of the information associated with a first user device using one of amplitude modulation, absolute phase modulation, and amplitude/absolute phase modulation; and
combining the first polarization state, the first frequency channel, and the first non-polarization modulation state to form a first combined modulation state; and
forming the wave state from the first combined modulation state.

33. The method according to claim 32, further comprising:
selecting a second polarization state from the constellation using a pseudorandom number that is associated with a second user device;
forming a second non-polarization state based on a portion of the information associated with the second user device using one of amplitude modulation, absolute phase modulation, and amplitude/absolute phase modulation;
combining the second polarization state and the second non-polarization modulation state with the first frequency channel to form a second combined modulation state; and
forming the wave state by a combination of the first and second combined modulation states.

34. A method of radio communication, comprising:
modulating a radio signal transmitted from two differently polarized antennas during a state time in which a wave state of the radio signal conveys information and is based on one or more polarization states selected from a constellation of polarization states comprising at least three polarization states;
selecting a first polarization state from the constellation using a pseudorandom number that is associated with a first user device;
selecting a first time division multiplexing time slot associated with the first user device from a set of time slots for transmitting the wave state;
forming a first non-polarization state modulation based on a portion of the information associated with the first user device, using one of amplitude modulation, absolute phase modulation, and amplitude/absolute phase modulation;
combining the first polarization state and the first non-polarization modulation state to form a first combined modulation state; and
transmitting the first combined modulation state during the first time slot.

35. The method according to claim 34, further comprising:
selecting a second polarization state from the constellation using a pseudorandom number that is associated with a second user device;
forming a second non-polarization state modulation based on a portion of the information associated with the second user device, using one of amplitude modulation, absolute phase modulation, and amplitude/absolute phase modulation; and
combining the second polarization state and the second non-polarization modulation state to form a first combined modulation state;
combining the first and second combined modulation states; and
transmitting the first and second combined modulation states during the first time slot.

36. A method of radio communication, comprising:
modulating a radio signal transmitted from two differently polarized antennas during a state time in which a wave state of the radio signal conveys information and is based on one or more polarization states selected from a constellation of polarization states comprising at least three polarization states;
    selecting a chip from each of M data symbols intended for corresponding M user devices;
    performing M logical operations, each being a logical operation of an orthogonal function value associated with each of the M user devices and the chip from the corresponding user device;
    combining results of the M logical operations; and
selecting a polarization states using the combined results.

37. A method of radio communication, comprising:
modulating a radio signal transmitted from two differently polarized antennas during a state time in which a wave state of the radio signal conveys information and is based on one or more polarization states selected from a constellation of polarization states comprising at least three polarization states;
    selecting a polarization state from the constellation of polarization states using a first pseudorandom number associated with a user device;
    selecting a frequency channel from a set of frequency channels using a second pseudorandom number associated with the user device;
    forming a non-polarization modulation state from a portion of the information associated with the user device using one of amplitude modulation, absolute phase modulation, and amplitude/absolute phase modulation; and
    combining the polarization state, the frequency state, and the non-polarization modulation state to form the wave state.

38. A method of radio communication, comprising:
modulating a radio signal transmitted from two differently polarized antennas during a state time in which a wave state of the radio signal conveys information and is based on one or more polarization states selected from a constellation of polarization states comprising at least three polarization states;
    determining a non-polarization modulation state that quantifies a portion of the information that is associated with a user device, that is to be transmitted within a frame having a duration that is a multiple of the state time;
    generating a first pseudorandom number associated with the user device;
    selecting a polarization modulation state using the first pseudorandom number;
    generating a second pseudorandom number associated with the user device;
    determining the wave state by combining the selected polarization modulation state with the non-polarization modulation state; and
    transmitting the wave state at a state time within the frame selected by using the second pseudorandom number.

39. A method of radio communication, comprising:
modulating a radio signal transmitted from two differently polarized antennas during a state time in which a wave state of the radio signal conveys information and is based on one or more polarization states selected from a constellation of polarization states comprising at least three polarization states; and
    forming the wave state based on a logical operation performed on a stored sequence of combined modulation states, wherein the operation is based on at least one previous combined modulation state that includes a polarization state.

40. The method according to claim 21, wherein the parameters are in a group of parameters that consists of received power levels at one or more of the user devices, a required carrier to interference power ratio, and a quantity of the potentially interfering user devices.

\* \* \* \* \*